US 8,073,921 B2
Dec. 6, 2011

(12) United States Patent
Thomas et al.

(10) Patent No.: US 8,073,921 B2
(45) Date of Patent: Dec. 6, 2011

(54) METHODS FOR REMOTE MONITORING AND CONTROL OF APPLIANCES OVER A COMPUTER NETWORK

(75) Inventors: C. Douglass Thomas, Campbell, CA (US); Albert S. Penilla, Sunnyvale, CA (US); Joseph A. Nguyen, San Jose, CA (US)

(73) Assignee: Advanced Technology Company, LLC, Plano, TX (US)

( * ) Notice: Subject to any disclaimer, the term of this patent is extended or adjusted under 35 U.S.C. 154(b) by 1610 days.

(21) Appl. No.: 11/115,021

(22) Filed: Apr. 25, 2005

(65) Prior Publication Data

US 2005/0198063 A1      Sep. 8, 2005

Related U.S. Application Data

(62) Division of application No. 09/098,279, filed on Jun. 16, 1998, now abandoned.

(60) Provisional application No. 60/051,489, filed on Jul. 1, 1997.

(51) Int. Cl.
*G06F 15/16* (2006.01)

(52) U.S. Cl. ....................................... 709/208

(58) Field of Classification Search .................. 709/286, 709/9, 220, 208; 379/106.01; 370/335; 380/29; G06F 15/16
See application file for complete search history.

(56) References Cited

U.S. PATENT DOCUMENTS

| | | | |
|---|---|---|---|
| 4,148,062 A | 4/1979 | Kamin | |
| 4,962,473 A | 10/1990 | Crain | |
| 5,086,385 A * | 2/1992 | Launey et al. | 700/83 |
| 5,091,780 A | 2/1992 | Pomerleau | |
| 5,164,979 A | 11/1992 | Choi | |
| 5,229,850 A | 7/1993 | Toyoshima | |
| 5,241,428 A | 8/1993 | Goldwasser et al. | |
| 5,270,811 A | 12/1993 | Ishibashi et al. | |
| 5,283,644 A | 2/1994 | Maeno | |
| 5,359,363 A | 10/1994 | Kuban et al. | |
| 5,396,284 A | 3/1995 | Freeman | |
| 5,412,708 A | 5/1995 | Katz | |
| 5,455,561 A | 10/1995 | Brown | |
| 5,467,264 A * | 11/1995 | Rauch et al. | 700/12 |
| 5,473,368 A | 12/1995 | Hart | |
| 5,491,511 A | 2/1996 | Odle | |
| 5,495,284 A | 2/1996 | Katz | |
| 5,553,609 A | 9/1996 | Chen et al. | |
| 5,581,297 A | 12/1996 | Koz et al. | |
| 5,619,183 A | 4/1997 | Ziegra et al. | |
| 5,625,410 A | 4/1997 | Washino et al. | |
| 5,629,687 A | 5/1997 | Sutton et al. | |
| 5,696,695 A * | 12/1997 | Ehlers et al. | 700/286 |
| 5,706,191 A * | 1/1998 | Bassett et al. | 700/9 |

(Continued)

OTHER PUBLICATIONS

Notice of Abandonment for U.S. Appl. No. 09/098,279, dated Jan. 18, 2007.

(Continued)

*Primary Examiner* — Tung Vo

(57) ABSTRACT

The remote monitoring and controlling of controllable devices is provided by sending control information to and receiving status information from information appliances over a network. A user is able to monitor the information appliances from a remote location, and control the information appliances from the remote location. The remote monitoring and control can be facilitated by graphical user interfaces. The information appliance can be a home lighting system, a home alarm system, a home entertainment system, a water gardening system, a home heating system, a home cooling system, and a television system having recording capabilities.

28 Claims, 21 Drawing Sheets

U.S. PATENT DOCUMENTS

| | | | |
|---|---|---|---|
| 5,717,379 | A | 2/1998 | Peters |
| 5,731,832 | A | 3/1998 | Ng |
| 5,734,823 | A * | 3/1998 | Saigh et al. .................. 709/229 |
| 5,745,166 | A | 4/1998 | Rhodes et al. |
| 5,751,345 | A | 5/1998 | Dozier et al. |
| 5,774,528 | A * | 6/1998 | Bogner et al. ........... 379/106.01 |
| 5,774,664 | A * | 6/1998 | Hidary et al. ................ 725/110 |
| 5,778,053 | A | 7/1998 | Skarbo et al. |
| 5,778,054 | A | 7/1998 | Kimura et al. |
| 5,812,054 | A | 9/1998 | Cohen |
| 5,861,804 | A | 1/1999 | Fansa et al. |
| 5,864,823 | A * | 1/1999 | Levitan ..................... 705/14.61 |
| 5,870,471 | A | 2/1999 | Wootton et al. |
| 5,892,442 | A | 4/1999 | Ozery |
| 5,892,758 | A * | 4/1999 | Argyroudis ................... 370/335 |
| 5,926,209 | A | 7/1999 | Glatt |
| 5,940,229 | A | 8/1999 | Baumgarten |
| 5,949,876 | A * | 9/1999 | Ginter et al. ..................... 705/80 |
| 5,956,405 | A * | 9/1999 | Yuval .............................. 380/29 |
| 5,982,418 | A | 11/1999 | Ely |
| 6,002,394 | A * | 12/1999 | Schein et al. ................... 725/39 |
| 6,038,289 | A | 3/2000 | Sands |
| 6,069,655 | A | 5/2000 | Seeley et al. |
| 6,091,771 | A | 7/2000 | Seeley et al. |
| 6,094,134 | A | 7/2000 | Cohen |
| 6,097,429 | A | 8/2000 | Seeley et al. |
| 6,133,847 | A * | 10/2000 | Yang ......................... 340/12.25 |
| 6,166,729 | A | 12/2000 | Acosta et al. |
| 6,181,784 | B1 | 1/2001 | Duran et al. |
| 6,182,094 | B1 * | 1/2001 | Humpleman et al. ........ 715/234 |
| 6,230,325 | B1 * | 5/2001 | Iinuma et al. ................ 725/110 |
| 6,233,389 | B1 | 5/2001 | Barton et al. |
| 6,237,027 | B1 | 5/2001 | Namekawa |
| 6,263,507 | B1 * | 7/2001 | Ahmad et al. ................ 725/134 |
| 6,266,082 | B1 | 7/2001 | Yonezawa et al. |
| 6,271,752 | B1 | 8/2001 | Vaios |
| 6,285,746 | B1 | 9/2001 | Duran et al. |
| 6,288,643 | B1 | 9/2001 | Lerg et al. |
| 6,359,636 | B1 * | 3/2002 | Schindler et al. ............. 715/846 |
| 6,389,464 | B1 * | 5/2002 | Krishnamurthy et al. .... 709/220 |
| 6,526,158 | B1 | 2/2003 | Goldberg |
| 6,573,927 | B2 | 6/2003 | Parulski et al. |
| 6,674,960 | B2 | 1/2004 | Duran et al. |
| 6,732,372 | B2 * | 5/2004 | Tomita et al. ................... 725/47 |
| 6,788,882 | B1 | 9/2004 | Geer et al. |

OTHER PUBLICATIONS

Examiner's Answer to Appeal Brief for U.S. Appl. No. 09/098,279, dated Apr. 20, 2006.
Appeal Brief filed for U.S. Appl. No. 09/098,279, dated Feb. 3, 2006.
Office Action for U.S. Appl. No. 09/098,279, dated Aug. 31, 2005.
Appeal Brief filed for U.S. Appl. No. 09/098,279, dated May 26, 2005.
Notice of Appeal Filed for U.S. Appl. No. 09/098,279, dated Dec. 27, 2004.
Office Action for U.S. Appl. No. 09/098,279, dated Aug. 25, 2004.
Office Action for U.S. Appl. No. 09/098,279, dated Nov. 5, 2003.
Restriction Requirement for U.S. Appl. No. 09/098,279, dated Jul. 30, 2003.
Appeal Brief filed for U.S. Appl. No. 09/098,279, dated May 27, 2003.
Notice of Appeal Filed for U.S. Appl. No. 09/098,279, dated Feb. 24, 2003.
Office Action for U.S. Appl. No. 09/098,279, dated Nov. 19, 2002.
Office Action for U.S. Appl. No. 09/098,279, dated Jun. 5, 2002.
Office Action for U.S. Appl. No. 09/098,279, dated Sep. 25, 2001.
Office Action for U.S. Appl. No. 09/098,279, dated Mar. 23, 2001.
Office Action for U.S. Appl. No. 09/098,279, dated Aug. 29, 2000.
Alex Tutusaus, "*Karen's Living Room Cam*", "*The Fish Cam*", Original Web Design ©1997, The Live WebCams Ring.
Mark Lockareff, "*LonWorks® Technology and the LonMark™ Standard*', May 1996, pp. 1-16, Cover and Appendix 1, Echelon Corp., Palo Alto, CA.
Reza Raji, "*End-to-End Solutions with LonWorks® Control Technology*", Rev. 1.1, pp. 1-10, 1998 Echelon Corp., Palo Alto, CA.
Reza Raji, "*Control Networks and the Internet*", Rev. 2.0, pp. 1-13, 1998 Echelon Corp., Palo Alto, CA.
Todd Spangler, "*The Intranet Channel*", PC Magazine, vol. 16, No. 11, Jun. 1997.
Unknown, "*An Exploration of Dynamic Documents*", push@netscape.com, 7 pgs.
Connectix Corp.,"*DigitalRadar Keeps Watch When You're Away*", ©1997, Jul. 28, 1997, San Mateo, CA., 2 pages.
Connectix Corp., "*DigitalRadar*", ©1997, San Mateo, CA, 3 pgs.
Connectix Corp., "*How it all works . . .*" ©1997, San Mateo, CA, 2 pgs.
Echelon Corp., "*LonWorks® for Audio Computer Control Network Applications*", Jan. 1995, pp. 1-30, Palo Alto, CA.
"*Remote Building Monitoring and Operations Project Home Page*", pp. 1-2, May 1997, Lawrence Berkeley National Laboratory, Berkeley, CA.
"*Remote Building Monitoring and Operations Project Status*", Jan. 1996, pp. 1-4, Lawrence Berkeley National Laboratory, Berkeley, CA.
Crestron.com, "*SmarTouch STS*", Crestron pgs. products, crestron@crestron.com., 8 pgs.
Technology Interface, Inc., "*Why You Need WebCam*", 2 pgs.
"*Style and Technology in Harmony*," Audio/Video Interiors, May 1993, 3 pgs.
IBM Corp., "*I See You—Daycare Internet Service*", 1997, IBM small business connection, 2 pgs.
"*Big Daddy is Watching*" 7.97 San Jose Mercury News Business section article, (re Simplex Knowledge Co.), Jul. 8, 1997, 2 pgs.
Connectix Corp., "*Frequently Asked Questions*", webpage, ©1997, San Mateo, CA, 3 pgs.
Connectix Corp., "*Connectix Company*", webpage, ©1997, Connectix Corp., San Mateo, CA., 5 pgs.
WebCam Setup Dialogs., MacWebCam screens, 4 pgs.
Notice of Abandonment for U. S. Appl. No. 09/098,279, dated Mar. 26, 2008.
Decision on Appeal to Board of Patent Appeals and Interferences for U. S. Appl. No. 09/098,279, dated Jan. 14, 2008.
Order from CAFC remanding case to BPAI re U.S. Appl. No. 09/098,279, dated Jun. 8, 2007.
Letter from USPTO withdrawing Notice of Abandonment for U. S. Application No. 09/098,279.
Decision on Appeal to Board of Patent Appeals and Interferences for U. S. Appl. No. 09/098,279, dated Dec. 21, 2006.

* cited by examiner

Internet Provider

Remote Control Home

Home Security
- ☒ Turn on Home CAM
- ☐ Turn off Home CAM
- ☒ Detect Change in Room Security Breach in Room:
- Bedroom 1: No
- Bedroom 2: No
- ⋮
- Living Room: Yes

[View Security Breach]

[More Settings]

Home Utilities

Temperature Control
[72°F]

Room Lighting:
|  | On | Off |
|---|---|---|
| Bedroom 1 | ☒ | ☐ |
| Bedroom 2 | ☒ | ☐ |
| ⋮ | | |
| Living Room | ☐ | ☒ |

WATER GARDEN:
- Front: ☒ [Time] ☐
- Back: ☒ [Time] ☐

[More Settings]

Home Entertainment Controls

Set TV For Recording: On ☒  Off ☐

Select Channel for Recording

| | | Start Time/Date |
|---|---|---|
| Channel | 054 | 9:15 PM 10/5/97 |
| Channel | 002 | 6:00 AM 10/6/97 |
| ⋮ | | |
| Channel | 167 | 4:00 PM 10/6/97 |

[More Settings]

METHODS FOR REMOTE MONITORING AND CONTROL OF APPLIANCES OVER A COMPUTER NETWORK

CROSS REFERENCE TO RELATED APPLICATION

This application is a divisional application and claims 35 U.S.C. §120 priority from U.S. patent application Ser. No. 09/098,279, filed Jun. 16, 1998 now abandoned and entitled "METHOD AND APPARATUS FOR REMOTE MONITORING AND CONTROL OVER A COMPUTER NETWORK" and such application claims benefit of priority under 35 U.S.C. 119(e) of U.S. Provisional Application No. 60/051,489, filed Jul. 1, 1997 and entitled "METHOD AND APPARATUS FOR REMOTE MONITORING AND CONTROL OVER A COMPUTER NETWORK", the contents of each application is hereby incorporated by reference.

BACKGROUND OF THE INVENTION

1. Field of the Invention

The present invention relates to data transmissions over a network, and more particularly, to remote monitoring and control of articles over a network.

2. Description of the Related Art

Remote monitoring of buildings or grounds is often done for security reasons. One conventional approach to remote monitoring of buildings and grounds uses a series of cameras position throughout the building and around the grounds. These cameras are then directly wired to a central monitoring location where a security guard sits and is able to view the images from the various cameras. By viewing the images at the central monitoring location, the security guard is able to detect a security breach when the images show an unauthorized person within the building or on the grounds. This conventional approach to remote monitoring is expensive to implement because specialized equipment and personnel are required. The central monitoring location is normally in a fixed location which is on-site or nearby.

Security systems, such as for a home, often protect the perimeter of the building along with one or more internal sensors. The internal sensors can, for example, include motion sensors, light beams, and the like. Cameras are not normally a part of a home security system. However, when cameras are provided, they generally operate to continuously record so as to presumably provide images of any intruders. Hence, the camera is a secondary part of the security system which does not actively participate in detecting an intruder. In any case, when the security system detects an intruder, an alarm is normally sounded and automatic telephone notification may be provided to the local police and/or a central office of a security company. Although, in most cases, no remote monitoring of the images provided by the camera is available, U.S. Pat. Nos. 5,164,979 and 5,412,708 describe approaches which use telephone lines to send images off-site for safe archive or for remote monitoring.

Remote monitoring is also done for a variety of other purposes. As an example, U.S. Pat. No. 5,553,609 describes a remote visual monitoring system for in-home patient health care from a remote location via a telephone line.

WebCams have recently been use to provide remote viewing of various locations. For example, WebCams may be used to view traffic conditions, sea conditions, home locations, fish tanks, and many other things. However, the operation of these WebCams is problematic because of the high bandwidth requirements to transmit video from the camera serving as the WebCam and its server and viewers. The existing solution to limit the bandwidth utilization is to periodically transmit still images from a camera to an Internet server after a predetermined period of time. Then, for viewers of the images over the Internet, an Internet browser can access the still images from the Internet server and display the images on their computer system. Again, however, to limit bandwidth requirements, the Internet browser only periodically accesses (or receives by a push from) the Internet server to retrieve the newest images after a predetermined period of time. For example, the predetermined period of time between transmissions is generally selectable from a few options such as 30 seconds, 60 seconds, 1 minute, and 5 minutes. Although this conventional approach does limit the bandwidth utilization, the amount of bandwidth being utilized is nevertheless largely wasted when the image is not significantly changing.

Thus, there is a need for improved approaches to remotely monitor a location.

SUMMARY OF THE INVENTION

Broadly speaking, the invention relates to improved techniques to remotely monitor locations, to detect activity, and to remotely monitor and control devices or appliances through a network. In one embodiment, the network in the Internet and the transmission is facilitated by an Internet server or electronic mail.

The remote monitoring of locations is provided by efficiently transmitting images over the network to a remote machine located at a remote location. In one embodiment, the efficiency is facilitated by comparing a current image with a reference image, and then only transmitting the current image if it differs from the reference image by more than a predetermined threshold amount. The remote monitoring can also operate as an alarm system or provide intruder detection based on detected changes in images from a locally provided camera.

The remote monitoring and controlling of controllable devices is provided by sending control information to and receiving status information from information appliances over a network. A user is thus able to not only monitor the information appliances from a remote location, but also control the information appliances from the remote location. The remote monitoring and control can be facilitated by graphical user interfaces.

The invention can be implemented in numerous ways, including as a computer system, an apparatus, a method, and a computer readable media. Several embodiments of the invention are discussed below.

As a surveillance method for providing remote surveillance of an internal area of a building, an embodiment of the invention includes the operations of: receiving a surveillance image from a local camera directed at the internal area of the building; comparing the surveillance image with a reference image to produce a comparison result; detecting presence of an activity condition based on the comparison result; and notifying an interested user of the activity condition when the presence of the activity condition is detected. Optionally, the notifying can transmit the surveillance image to a remote computer over a network when the activity condition is detected.

As a system for providing remote visual monitoring of a location, an embodiment of the invention includes a camera, a remote computer, and a local image controller. The camera obtains an image of the location. The remote computer has a display device capable of viewing images, and is remote from the location. The local image controller operatively connected to the camera, and operates to receive the image from the camera and then to determine whether an activity condition is present. The local image controller forwards the image to the remote computer over a network when the activity condition is present, and the local image controller does not forward the image to the remote computer over the network when the activity condition is not present.

As a method for controlling an information appliance at a local location from a remote location, an embodiment of the invention includes the operations of: providing an information appliance capable of being controlled at a local location, the information appliance being electrically connected to a local computer, and the local computer capable of being electrically connected to a network of computers; displaying a graphical control screen on a remote computer at a remote location, the control screen including a plurality of selectable control actions for the information appliance, and the remote computer capable of being electrically connected to the network of computers; selecting at least one of the control actions for the information appliance at the local location to perform; forming a control message for the information appliance; electrically transmitting the control message from the remote computer to the local computer; sending control signals from the local computer to the information appliance in accordance with the control message; and controlling the information appliance based on the control signals.

As a method for obtaining, at a remote location, status information from a information appliance at a local location, an embodiment of the invention includes the operations of: providing an information appliance capable of being controlled at a local location, the information appliance being electrically connected to a local computer, and the local computer capable of being electrically connected to a network of computers; sending a status request from a remote computer to the local computer for status information on the controllable device, the remote computer capable of being electrically connected to the network of computers; determining, by the local computer, the status information for the controllable device; electrically transmitting the determined status information from the local computer to the remote computer; and displaying a graphical status screen on the remote computer, the status screen including the determined status information.

As a method for remotely controlling home appliances associated with a home over an Internet network, an embodiment of the invention includes the operations of: connecting the home appliances to a first processing unit located in the home, with the first processing unit capable of coupling to the Internet network; and communicating a control signal through a graphical user interface associated with a second processing unit that is remotely located from the first processing unit and also capable of coupling to the Internet network. The control signal is directed to at least one of the home appliances via the Internet network. The control signal causes a change in an operating state of the at least one of the home appliances when received by the at least one of the home appliances.

As a method for detecting an activity condition using a camera, an embodiment of the invention includes the operations of: receiving a reference image from a camera directed in a predetermined direction; storing a reference image; receiving a current image from a camera directed in the predetermined direction; comparing the current image with the reference image to detect an activity condition; and signaling an alarm condition when the comparing detects the activity condition.

Other aspects and advantages of the invention will become apparent from the following detailed description, taken in conjunction with the accompanying drawings, illustrating by way of example the principles of the invention.

BRIEF DESCRIPTION OF THE DRAWINGS

The present invention will be readily understood by the following detailed description in conjunction with the accompanying drawings, wherein like reference numerals designate like structural elements, and in which:

FIG. 15 is another GUI window for a remote computer according to an embodiment of the invention;

DETAILED DESCRIPTION OF THE INVENTION

The invention relates to improved techniques to remotely monitor locations, to detect activity, and to remotely monitor and control devices or appliances through a network. In one embodiment, the network is the Internet and the transmission is facilitated by an Internet server or electronic mail.

The remote monitoring of locations is provided by efficiently transmitting images over the network to a remote machine located at a remote location. In one embodiment, the efficiency is facilitated by comparing a current image with a reference image, and then only transmitting the current image if it differs from the reference image by more than a predetermined threshold amount. The remote monitoring can also operate as an alarm system or provide intruder detection based on detected changes in images from a locally provided camera.

The remote monitoring and controlling of controllable devices is provided by sending control information to and receiving status information from information appliances over a network. A user is thus able to not only monitor the information appliances from a remote location, but also control the information appliances from the remote location. In another embodiment, the information appliances may include an electronic home control panel that is wired to various controllable devices (e.g., sprinkler system, water heating system, air conditioner system, etc.) throughout a home or building. The remote monitoring and control can be facilitated by graphical user interfaces.

Embodiments of the invention are discussed below with reference to FIGS. 1-17. However, those skilled in the art will readily appreciate that the detailed description given herein with respect to these figures is for explanatory purposes as the invention extends beyond these limited embodiments.

Figure 1:
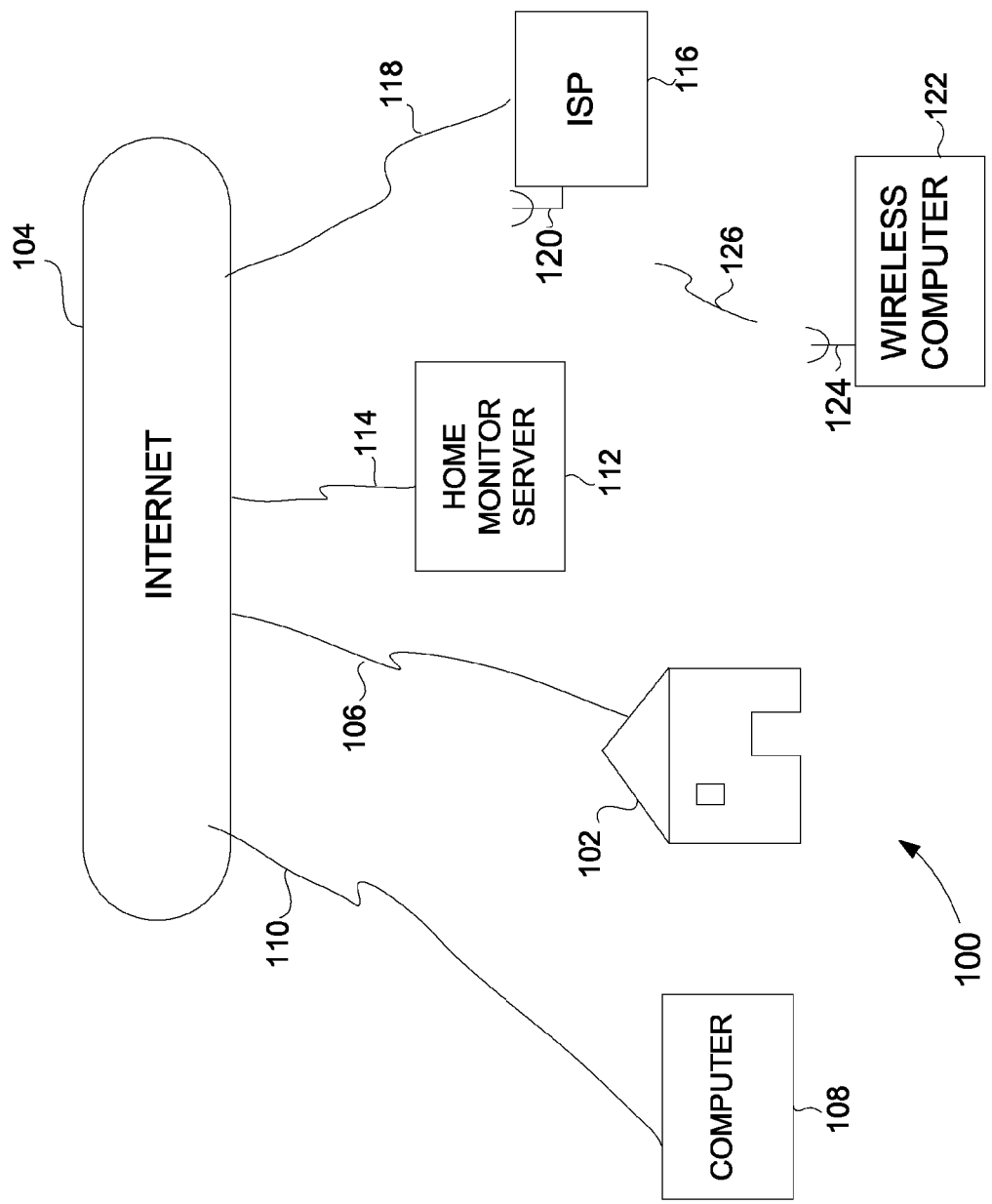
FIG. 1 is a diagram of a system of interconnected computers according to an embodiment of the invention.

FIG. 1 is a diagram of a system 100 of interconnected computers. The system 100 includes a home location 102 where visual monitoring may occur from a remote location. The home location 102 is typically a building or some other structure, and the visual monitoring is typically of an internal region of the building, the building's grounds, or other structure. The home location 102 couples to the Internet 104 through a communications link 106. Accordingly, the home location 102 preferably includes an image controller that couples to the communications link 106 through a wired modem, wireless modem or cellular link.

The Internet 104 is a global network of interconnected computers. A remote computer 108 also couples to the Internet through a communications link 110. The remote computer 108 is located at a location that is remote with respect to the home location 102. For example, the remote computer 108 might be at one's place of employment or might be a portable computer that travels with its user. The communications links 106, 110 can be implemented in a number of ways. For example, the communications link 106 can be implemented as a modem at the home location 102 that connects through a telephone line to a modem of an Internet Service Provider (ISP) which in turn connects to the Internet 104. In another embodiment, the communications links 106 and 110 may be high speed coaxial lines (i.e., cable TV lines) that are suited to transmit data, video and audio in a compressed or uncompressed format.

The system 100 also includes a home monitor server 112 that couples to the Internet 114 through a communications link 114. The home monitor server 112 preferably stores images for the home location 102 and a plurality of other like home locations. Persons wishing then to remotely view the images of their home location can access the home monitor server 112 via the Internet 104. In one embodiment, the communications link 114 is a high speed link such as a T1 or T2 line.

The system 100 may also include an ISP 116 that couples to the Internet 118 to provide wireless access to the Internet 104. The ISP 116 includes an antenna 120 that transmits and receives radio signals to and from a wireless computer 122 having an antenna 124, thus providing a wireless link 126. Hence, the user of the wireless computer 122 is also able to access the home monitor server 112 to remotely view the images of their home via the wireless link 126, the ISP 116, the communication link 118 and the Internet 104.

Figure 2:
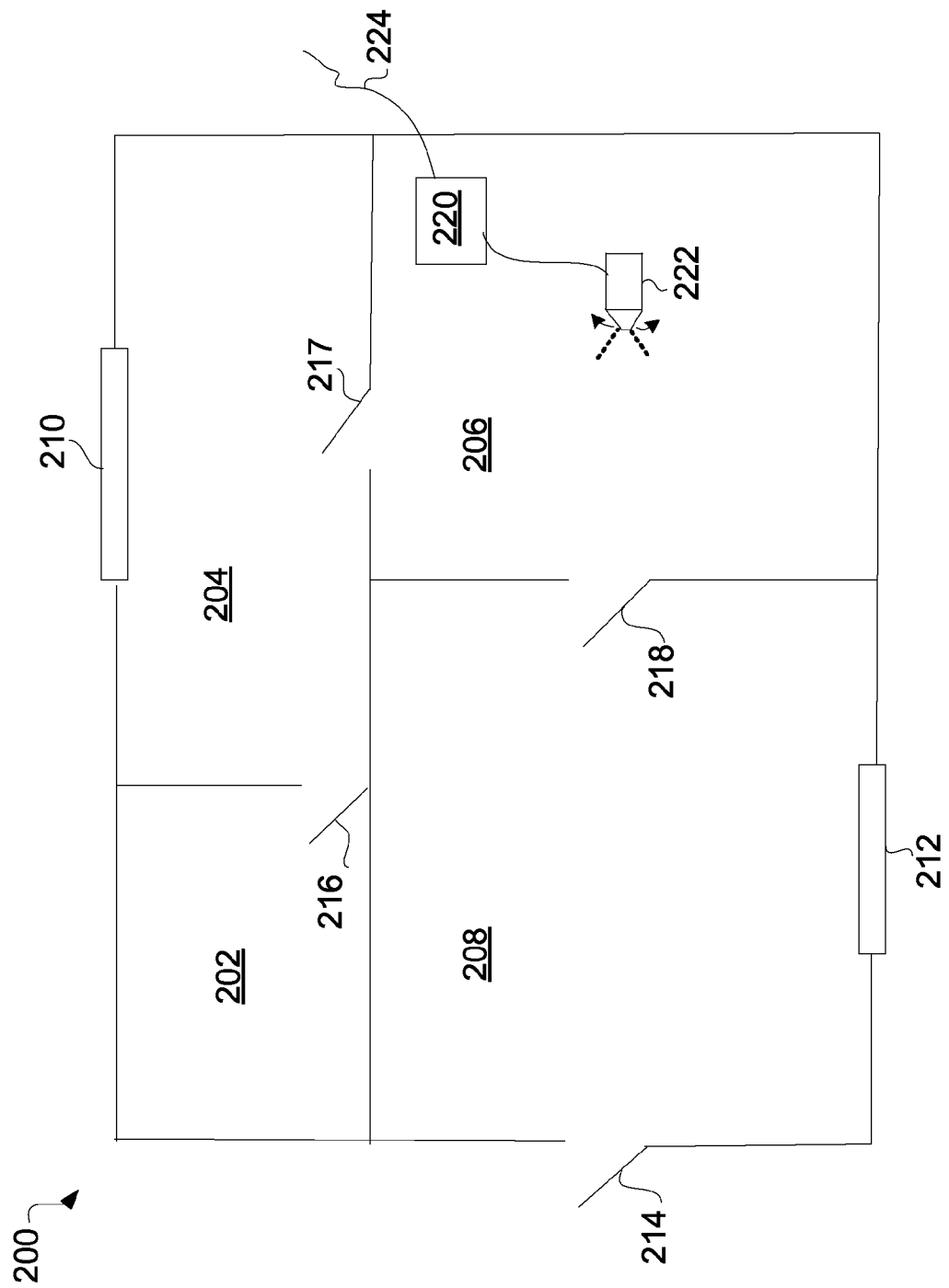
FIG. 2 is a schematic diagram of a representative embodiment of the internal layout of a home location according to an embodiment of the invention.

FIG. 2 is a schematic diagram 200 of a representative embodiment of the internal layout of the home location 102. The schematic diagram 200 depicts rooms 202, 204, 206 and 208, windows 210 and 212, and doors 214, 216, 217 and 218. The window 210 is in the room 204, and the window 212 is in the room 208. The door 214 is an external door, and the doors 216, 217 and 218 are internal doors.

The schematic diagram 200 also depicts an image controller 220 and a camera 222. The camera 222 is coupled to the image controller 220, and the image controller 220 is coupled to the Internet 104 via a line 224 (e.g., phone line, coaxial cable line, etc.). The line 224 serves as part of the communication link 106. The camera 222 is depicted as being positioned in the room 206 and being directed at the door 218. Hence, the image obtained by the camera 222 is primarily an area in front of the door 218. However, the camera 222 may be panned, zoomed, tilted or otherwise controlled by the remote user to view other areas of the room based on the remote user's viewing preference.

In general, the camera 222 can be directed at any internal region in the home location 102. There may also be a multiple of cameras positioned throughout the home location 102.

Figure 3:
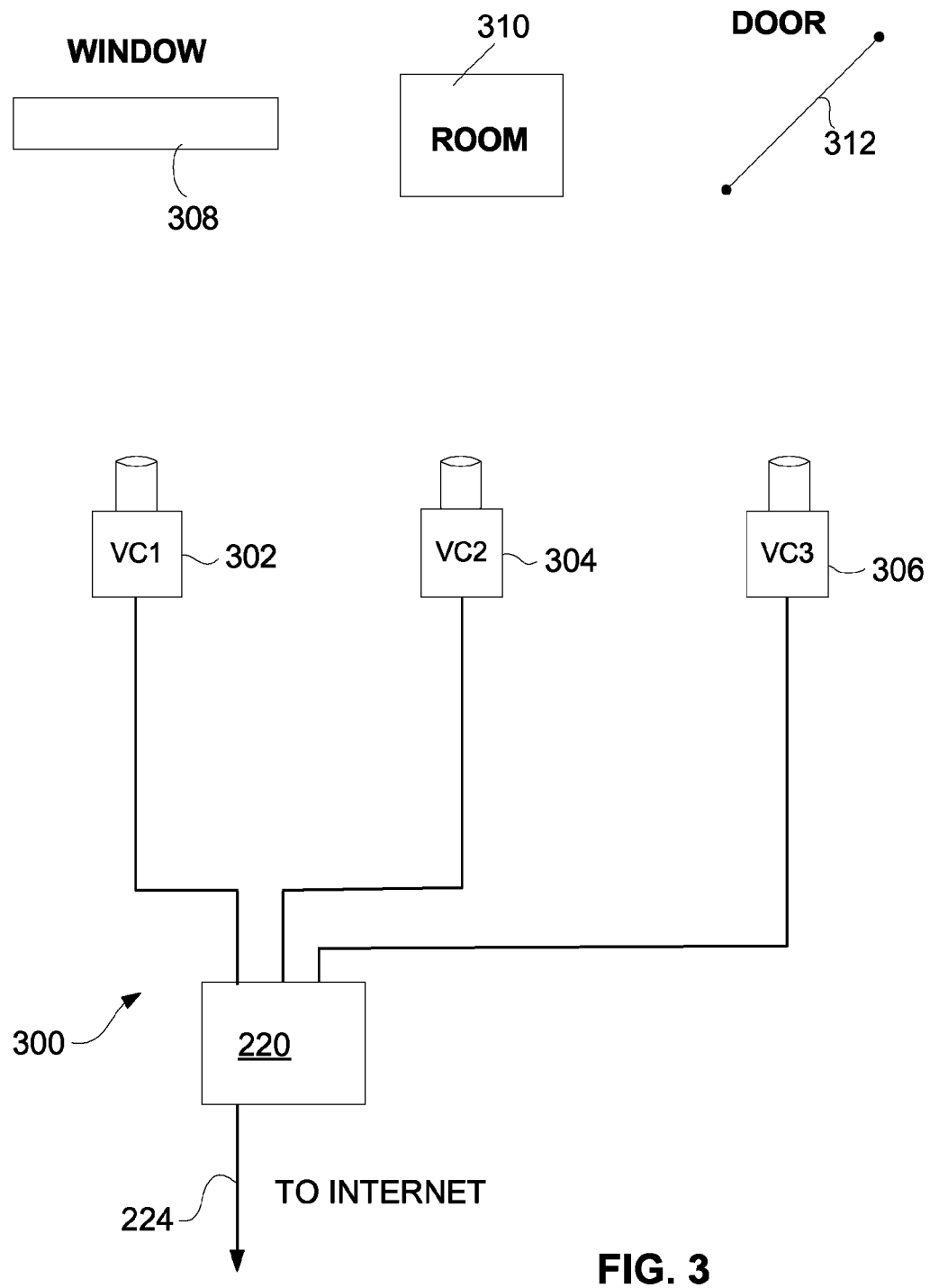
FIG. 3 illustrates an arrangement of multiple cameras according to an embodiment of the invention.

FIG. 3 illustrates an arrangement 300 of multiple cameras. In particular, the arrangement 300 includes a first video camera (VC1) 302, a second video camera (VC2) 304, and a third video camera (VC3) 306. The first video camera (VC1) is directed at a window 308, the second video camera is directed at a room 310, and the third video camera (VC3) is directed at a door 312. Each of the video cameras 302, 304 and 306 is coupled to the image controller 220 which in turn couples to the Internet 104 via the line 224. The image controller 220 is this able to provide images from each of the cameras 302, 304 and 306 over the Internet 104. The image controller 220 can operate in a variety of ways. Specifically, the image controller 220 can operate to forward one or more images from one of the cameras 302, 304 and 306 to the Internet 104, or the image controller 220 can multiplex the images from the cameras 302, 304 and 306 and then forward them to the Internet 104. In either case, preferably, the images are forwarded to the home monitor server 112 which facilitates viewing of the images through the Internet 104.

Figure 4:
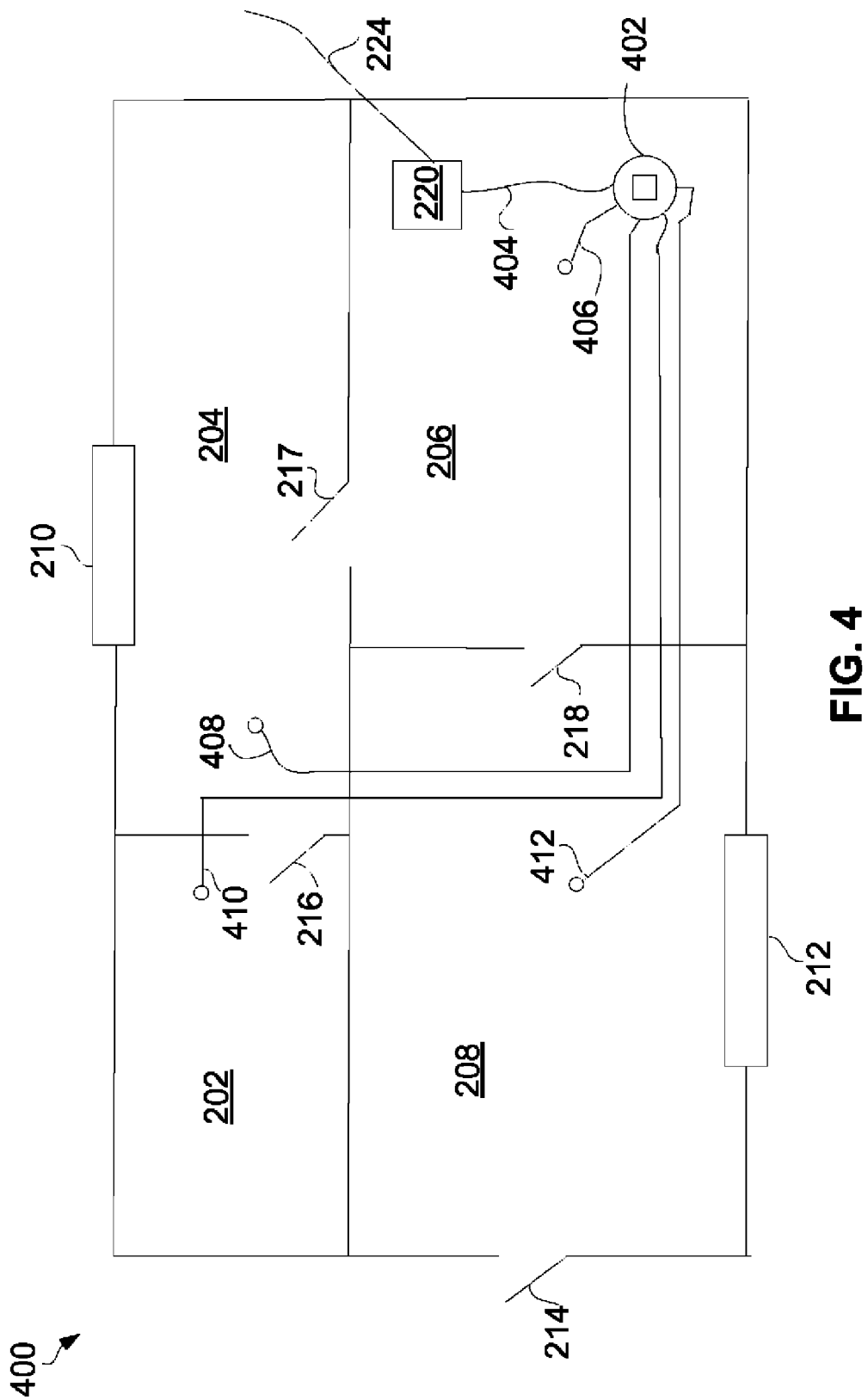
FIG. 4 is a schematic diagram of another representative embodiment of the internal layout of the home location in which multiple locations are monitored with a single camera according to an embodiment of the invention.

FIG. 4 is a schematic diagram 400 of another representative embodiment of the internal layout of the home location 102 in which multiple locations are monitored with a single camera. Like the schematic diagram 200 in FIG. 2, the schematic diagram 400 depicts rooms 202, 204, 206 and 208, windows 210 and 212, and doors 214, 216, 217 and 218. The schematic diagram 400 also depicts the image controller 220 and a camera apparatus 402. The camera apparatus 402 is coupled to the image controller 220 over a wire or cable 404, and the image controller 220 is coupled to the Internet 104 via the line 224 (e.g., phone line, coaxial cable line, etc.). As mentioned above, the line 224 serves as part of the communication link 106. The camera apparatus 402 is depicted as being positioned in the room 206 and operating to support acquisition of a plurality of images. In particular, the camera apparatus 402 optically couples to optical cables 406-412 (e.g., fiber optic lines) so as to alternatively retrieve an image from different locations in response to a remote user's command. The optical cable 406 is used in obtaining an image of the room 206, the optical cable 408 is used in obtaining an image of the room 208, the optical cable 410 is used in obtaining an image of the room 202, and the optical cable 412 is used in obtaining an image of the room 208. Although the location illustrated in FIG. 4 are internal to the home location 102, the one or more of the images could also correspond to external locations of the home location 102.

Figure 5A:
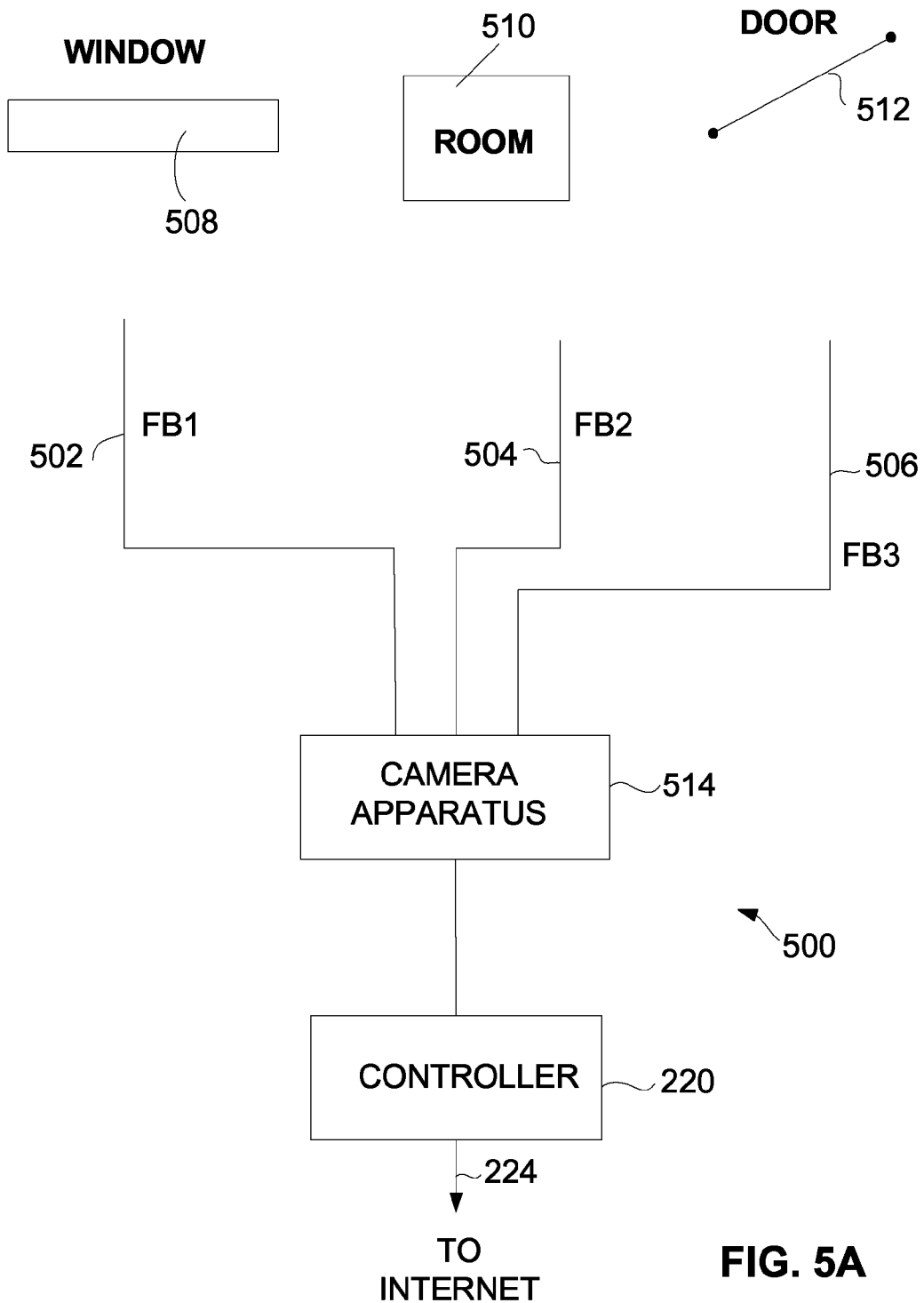
FIG. 5A illustrates an arrangement of a single camera and multiple fiber optic cables according to an embodiment of the invention.

FIG. 5A illustrates an arrangement 500 of a single camera and multiple fiber optic cables. In particular, the arrangement 500 includes a first fiber optic cable (FB1) 502, a second fiber optic cable (FB2) 504, and a third fiber optic cable (FB3) 506. The first fiber optic cable (FB1) 502 is directed at a window 508, the second fiber optic cable (FB2) 504 is directed at a room 510, and the third fiber optic cable (FB3) is directed at a door 512. Each of the fiber optic cables 502-506 is coupled to a camera apparatus 514 that services each of the fiber optic cables 502-506. In one embodiment, the camera apparatus 514 may include a single camera that may be selectively coupled (e.g., by a remote user by way of the Internet 104) to any one of the fiber optic cables 502-506 at any given point in time. The camera apparatus 514 thus produces images from each of the fiber optic cables 502-506. Additionally, the camera apparatus 514 is connected to the image controller 220 which in turn couples to the Internet 104 via the line 224. The image controller 220 is thus able to provide images from the camera apparatus 514 over the Internet 104.

Figure 5B:
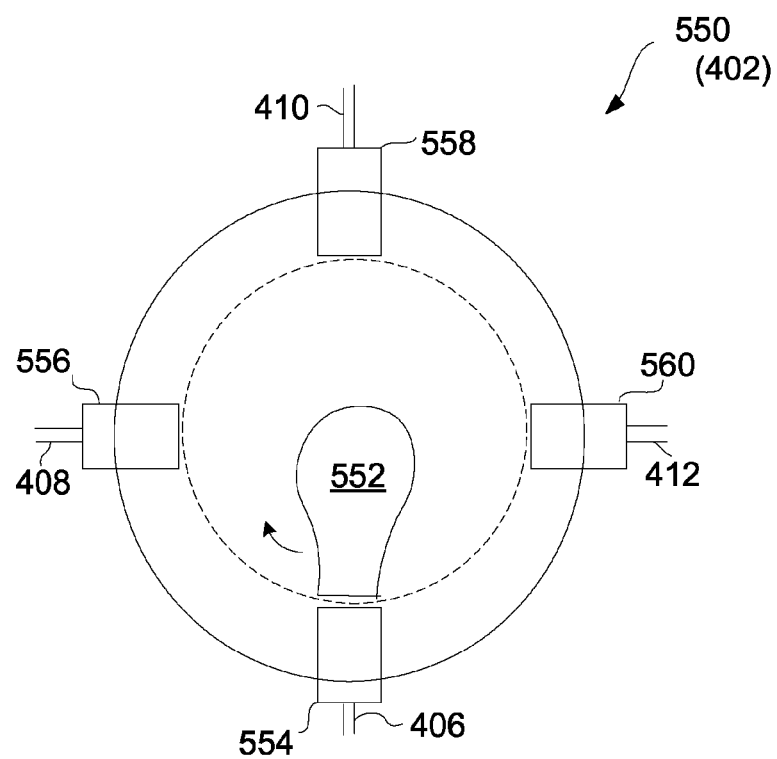
FIG. 5B is schematic diagram of a camera apparatus according to an embodiment of the invention.

FIG. 5B is schematic diagram of a camera apparatus 550 according to an embodiment of the invention. The camera apparatus 550 is suitable for a variety of implementations, including the camera apparatus 402 of FIG. 4 and the camera apparatus 514 of FIG. 5A. For ease of understanding, the camera apparatus 550 is discussed with reference to its use as the camera apparatus 402 of FIG. 4. In this embodiment, the camera apparatus 550 includes a camera 552 that rotates within the camera apparatus 550 so as to couple to different fiber optic cables and thus acquire a plurality of images. In this embodiment, the image may be in the form of a still image (e.g., JPEG), or in the form of a plurality of frames that are either compressed (e.g., MPEG) or uncompressed. The camera apparatus 550 also includes optical interfaces 554-560 for optically coupling a fiber optic cable to the camera 552. Specifically, when the camera 552 is directed at the optical interface 554, the camera 552 is optically coupled to the fiber optic cable 406, and thus acquires an image of the room 206. Likewise, when the camera 552 is directed at the optical interface 556, the camera 552 is optically coupled to the fiber optic cable 408 and acquires an image of the room 204; when the camera 552 is directed at the optical interface 558, the camera 552 is optically coupled to the fiber optic cable 410 and acquires an image of the room 202; and when the camera 552 is directed at the optical interface 560, the camera 552 is optically coupled to the fiber optic cable 412 and acquires an image of the room 208. The rotation of the camera 552 allows the camera 552 to couple to different ones of the optical interfaces 554-560. The rotation of the camera 552 can be controlled in a number of ways so as to acquire the images in various sequences, resolutions, and timings. In general, the camera apparatus 550 is controlled by the image controller 220.

Figure 6:
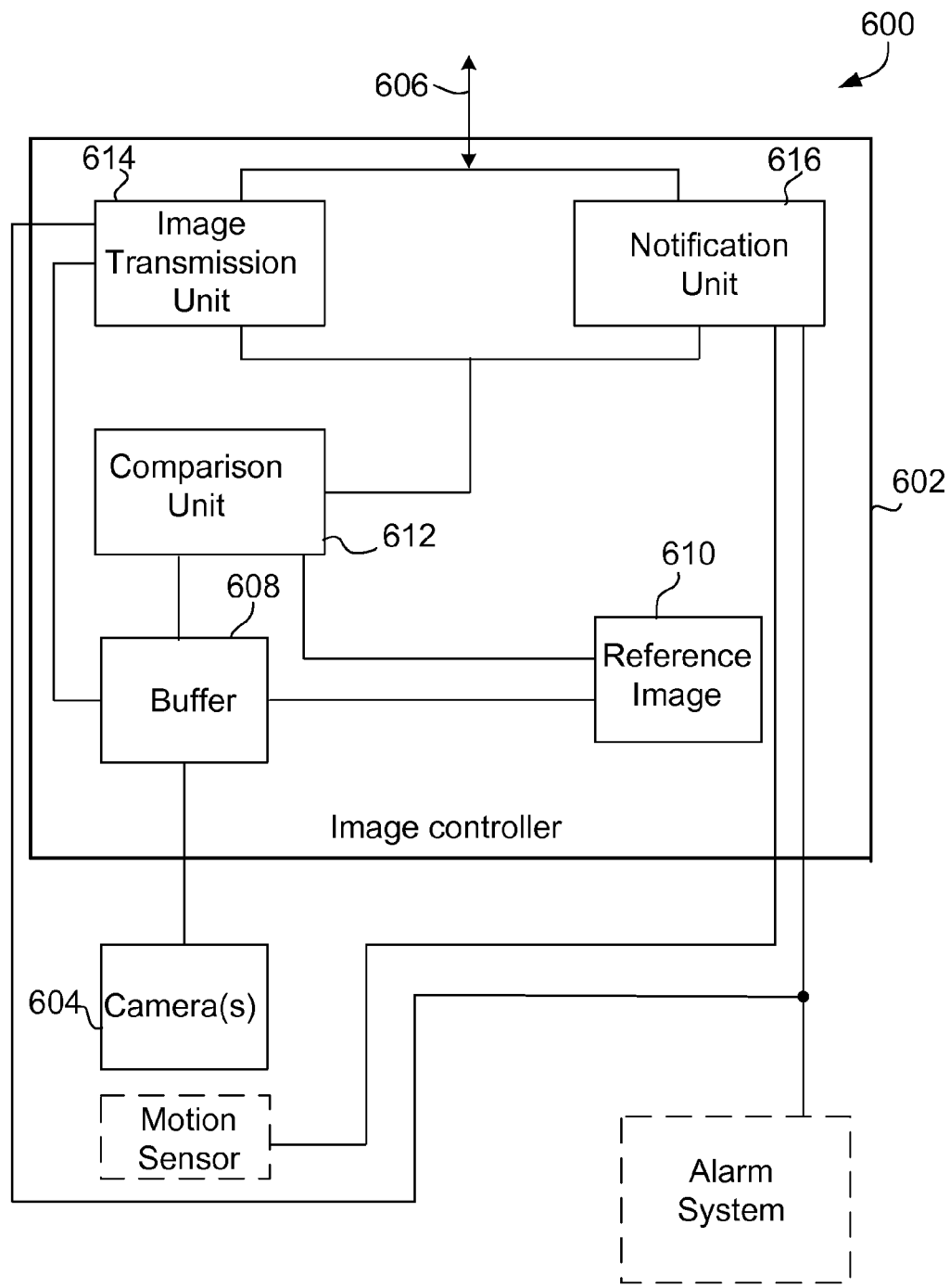
FIG. 6 is a block diagram of a visual monitoring system according to an embodiment of the invention.

FIG. 6 is a block diagram of a visual monitoring system 600 according to an embodiment of the invention. The visual monitoring system 600 is, for example, provided within the home location 102 to monitor one or more areas at the home location 102.

The visual monitoring system 600 includes an image controller 602 and one or more cameras 604. The camera(s) 604 produce images of the areas being monitored. The image controller 602 receives the images from the camera(s) 604 and controls the transmission of images to facilitate remote viewing of the images. The images are transmitted over a link 606 that couples the image controller 602 directly or indirectly to the Internet 104. For example, the link 606, which couples the image controller 602 to the Internet 104, may operate in conjunction with a modem that couples to a phone line or wireless modem for dial-up access to the Internet 104 via an Internet Service Provider (ISP).

The image controller 602 includes a buffer 608 that receives and stores the images from the camera(s) 604. A reference image storage 610 stores one or more reference images. In general, the reference image storage 610 stores a reference image for each of the cameras (or areas monitored by the camera(s)). Hereafter, for ease of understanding, it is assume that there is a single camera which monitors a single area. A comparison unit 612 compares the reference image from the reference image storage 610 with the current image from the buffer 608 to produce a comparison result.

The comparison result is forwarded to an image transmission unit 614 and a notification unit 616. The image transmission unit 614 operates to transmit the current image from the buffer 608 to the Internet 104 through the link 606 when the comparison result indicates an update condition. Also, with the camera(s) 604 optionally including motion detectors 617 proximately located or integral thereto, the motion detectors 617 can also provide an indication of an update condition to the notification unit 616. On the other hand, the image transmission unit 614 operates to prevent the transmission of the current image from the buffer 608 to the Internet 104 when the comparison result does not indicate an update condition. Consequently, the image controller 602 is efficiently using the bandwidth of the communication connection to the Internet 104 because the current image is not transmitted unless the update condition has been detected.

The notification unit 616 is provided to notify an interested person of the update condition. There are a variety of ways the notification unit 616 can notify the interested user, namely, telephone, cellular phone, pager, electronic mail (i.e., e-mail), facsimile, etc. In one embodiment, the image can be transmitted as a file transfer over the Internet 104 and the interested person can be notified by pager. In another embodiment, the image can be transmitted to a hosting Internet server, and the interested user is then able to view the image by accessing the Internet server via a web browser application program executing on a computer (e.g., remotely located computer). In still another embodiment, the transmission of the image and its notification for the interested user can both be performed by sending an electronic mail message to the interested person, where the electronic mail message includes a textual, visual or audio notification and may have the image being transmitted as an attachment to the electronic mail message. The attached image is thereafter able to be remotely viewed by the interested user by a variety of approaches. One approach is for the attached image to be launchable (automatically or manually) into a viewer. Another approach is for the interested user to start an application program which is able to display the image(s). Still another approach is for the computer system to display the image(s). Yet another approach is for the computer system receiving the electronic mail message to automatically display the incoming image on the display screen (e.g., within a window, border or screen saver of the display screen). In one embodiment, once the image is displayed, the user may chose to view the image in a number of formats, including, as a still JPEG picture, or a plurality of moving MPEG pictures. Of course, if the user desires only a quick view, the still picture may be selected through a graphical user interface control panel.

The visual monitoring system 600 may also include an alarm system 618. The alarm system 618 is an independent system that supplies an alarm signal to the image controller 602 when the alarm is activated ("tripped"). The image transmission unit 614 of the image controller 602 may make use of the alarm signal in determining whether to transmit the current image. The notification unit 616 of the image controller 602 may also utilize the alarm signal in determining whether to notify an interested person. In one embodiment, the image transmission unit 614 can operate to avoid transmission of images until the presence of the alarm signal, which advantageously reduces demands on bandwidth utilization. In another embodiment, the images could be transmitted in accordance with the update condition without regard for the alarm signal so as to facilitate continuous remote viewing.

The image controller 602 can be implemented in a number of different ways. For example, the image controller 602 may be implemented by a general purpose computer. Alternatively, the image controller 602 could be implemented by dedicated special purpose hardware. For example, when the image controller 602 is implemented as special purpose hardware, a home touch screen may be mounted on a wall to allow, for example, a home owner to selectively enable or disable monitoring of selected rooms when the home owner is at home.

Figure 7B:
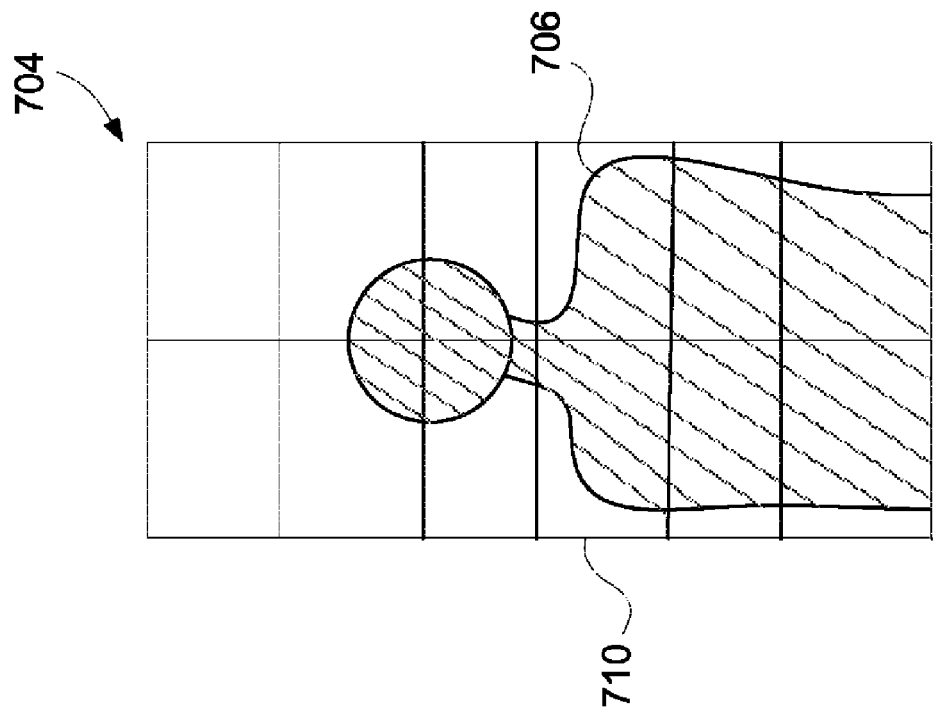
FIGS. 7A and 7B are diagrams illustrating a reference image and a current image according to an embodiment of the invention.
Figure 7A:
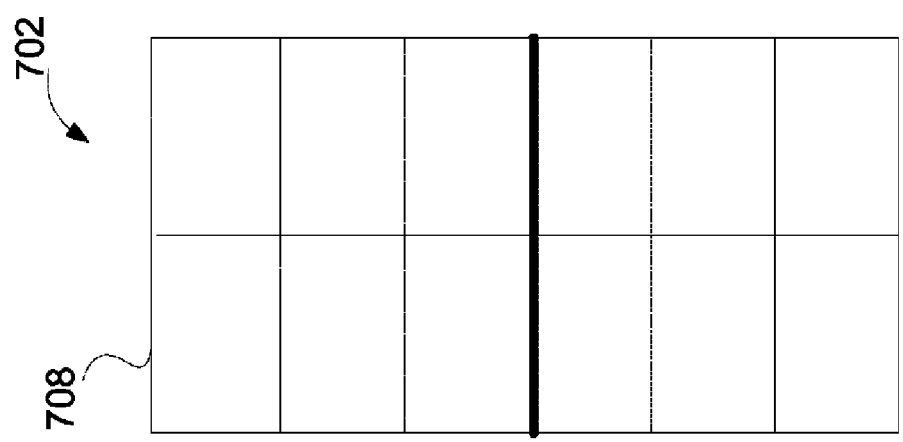

FIGS. 7A and 7B are diagrams illustrating a reference image 702 and a current image 704. The current image 704 contains a image of an intruder 706, whereas the reference image 702 does not. The comparison of the reference image 702 to the current image 704 can be performed in a number of ways. One way to compare the images is to compare intensity and/or color information of corresponding pixels. The number of pixels that differ by more than a minimal amount are deemed changed. Then, the total number of the changed pixels is compared against a predetermined threshold. When the total number of the changed pixels exceeds the predetermined amount, the update condition is present; otherwise, the update condition is not present. Another approach could superimpose an imaginary grid 708, 710 over the image and then produce an average intensity and/or color for each grid. Then, any of the grids having an average that differs by more than a threshold amount would cause the update condition to be present.

Figure 8:
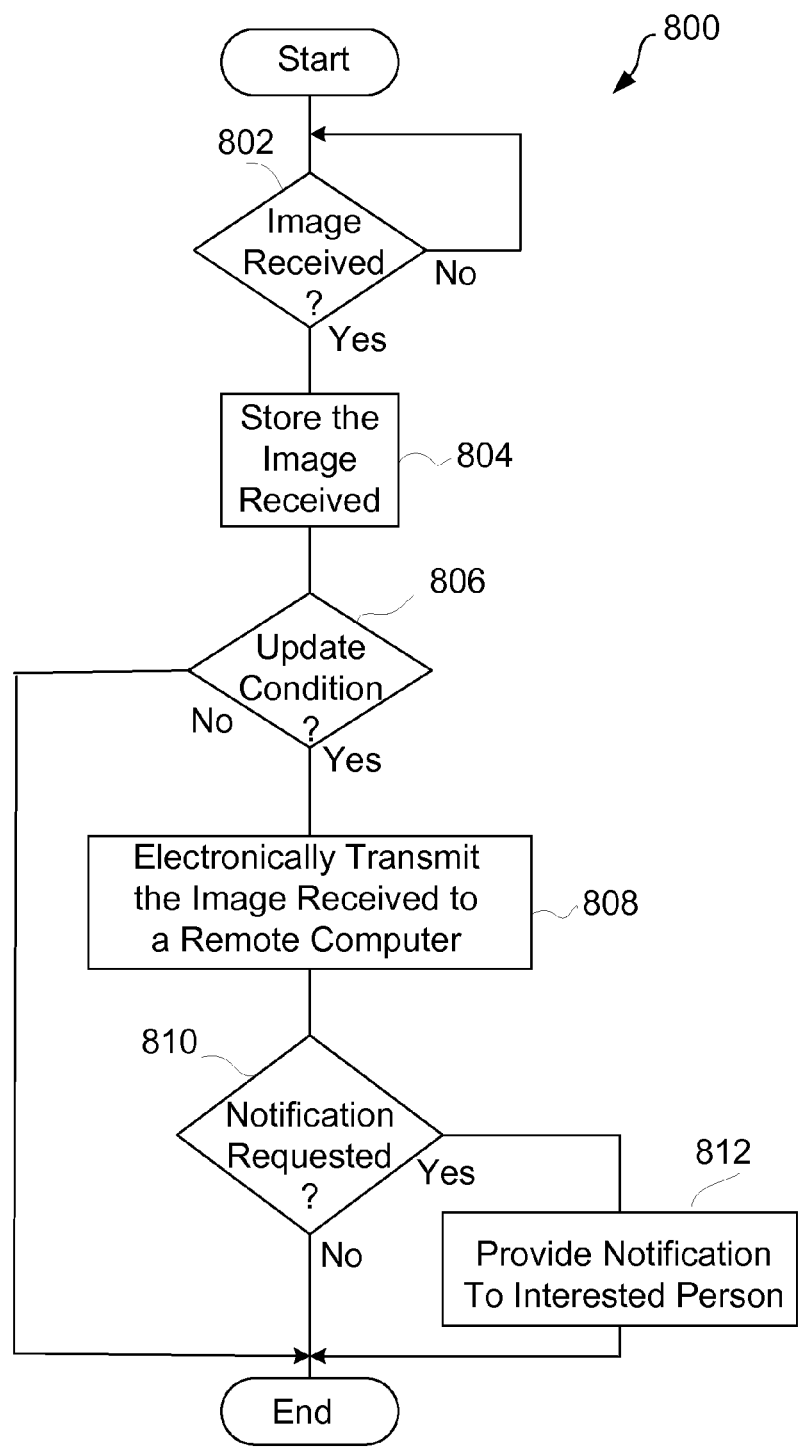
FIG. 8 is a flow diagram of local image processing according to an embodiment of the invention.

FIG. 8 is a flow diagram of local image processing 800 according to an embodiment of the invention. The local image processing 800 is, for example, performed by the image controller 220.

Initially, the local image processing 800 determines 802 whether an image has been received. More particularly, the image controller 220 determines whether an image has been received from the camera 222. Next, the image received is stored 804. The image received can be stored in any data storage device internal to or coupled to the image controller 220 or a computer implementing the image controller. A decision block 806 then determines whether an update condition is present. When the update condition is present, the image received is electronically transmitted 808 to a remote computer. The local image processing 800 then determines 810 whether notification has been requested. If it is determined that notification has been requested, then notification is provided 812 to an interested person. Following the decision block 810 directly when no notification is requested and following block 812 when notification has been requested, the local image processing 800 is complete and ends. Further, when the decision block 806 determines that the update condition is not present, then the local image processing 800 thereafter ends by bypassing blocks 808-812.

Figure 9A:
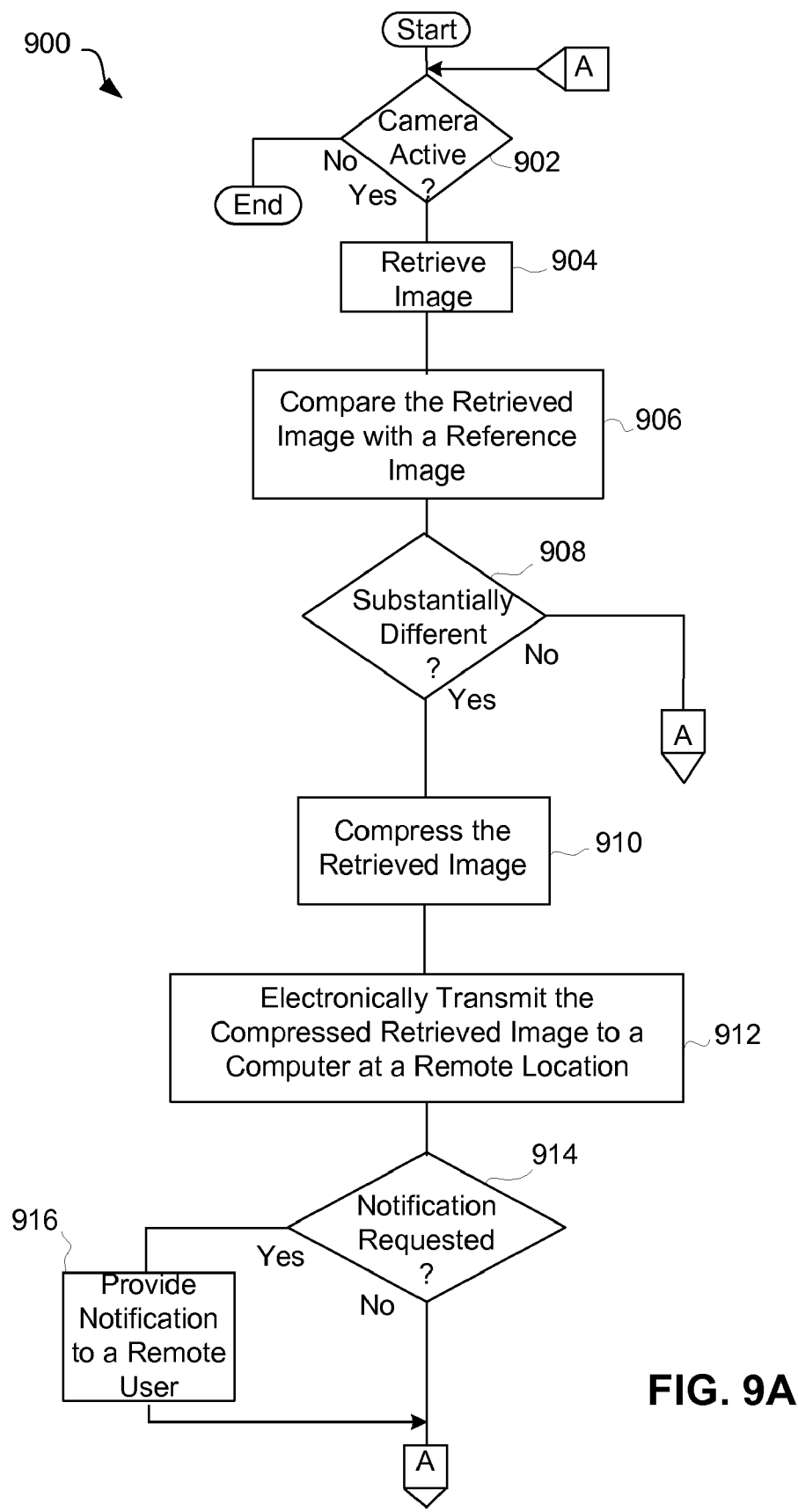
FIG. 9A is a flow diagram of local image processing according to another embodiment of the invention.

FIG. 9A is a flow diagram of local image processing 900 according to another embodiment of the invention. The local image processing 900 begins with a decision block 902 that determines whether the camera is active. If the camera is not active, then the local image processing 900 is complete and ends. On the other hand, when the camera is active, the local image processing 900 continues.

The local image processing 900 receives 904 an image from the camera. Then, the retrieved image is compared 906 with a reference image. Next, a decision block 908 determines whether the retrieved image is substantially different from the reference image. When the retrieved image is determined to be substantially different from the reference image, the retrieved image is compressed 910. Thereafter, the compressed retrieved image is electronically transmitted 912 to a computer at a remote location. A decision block 914 then determines whether notification has been requested. Here, in one embodiment, the notification may be requested by the operator of a local computer at the home location 102. When the decision block 914 determines that notification has been requested, then notification is provided 916 to a remote user. On the other hand, the block 916 is bypassed when notification is not requested.

Following block 916, following the decision block 914 when notification is not requested, and following decision block 908 when the images are not substantially different, the local image processing 900 returns to repeat block 902 and subsequent blocks for additional images being retrieved from the camera.

Figure 9B:
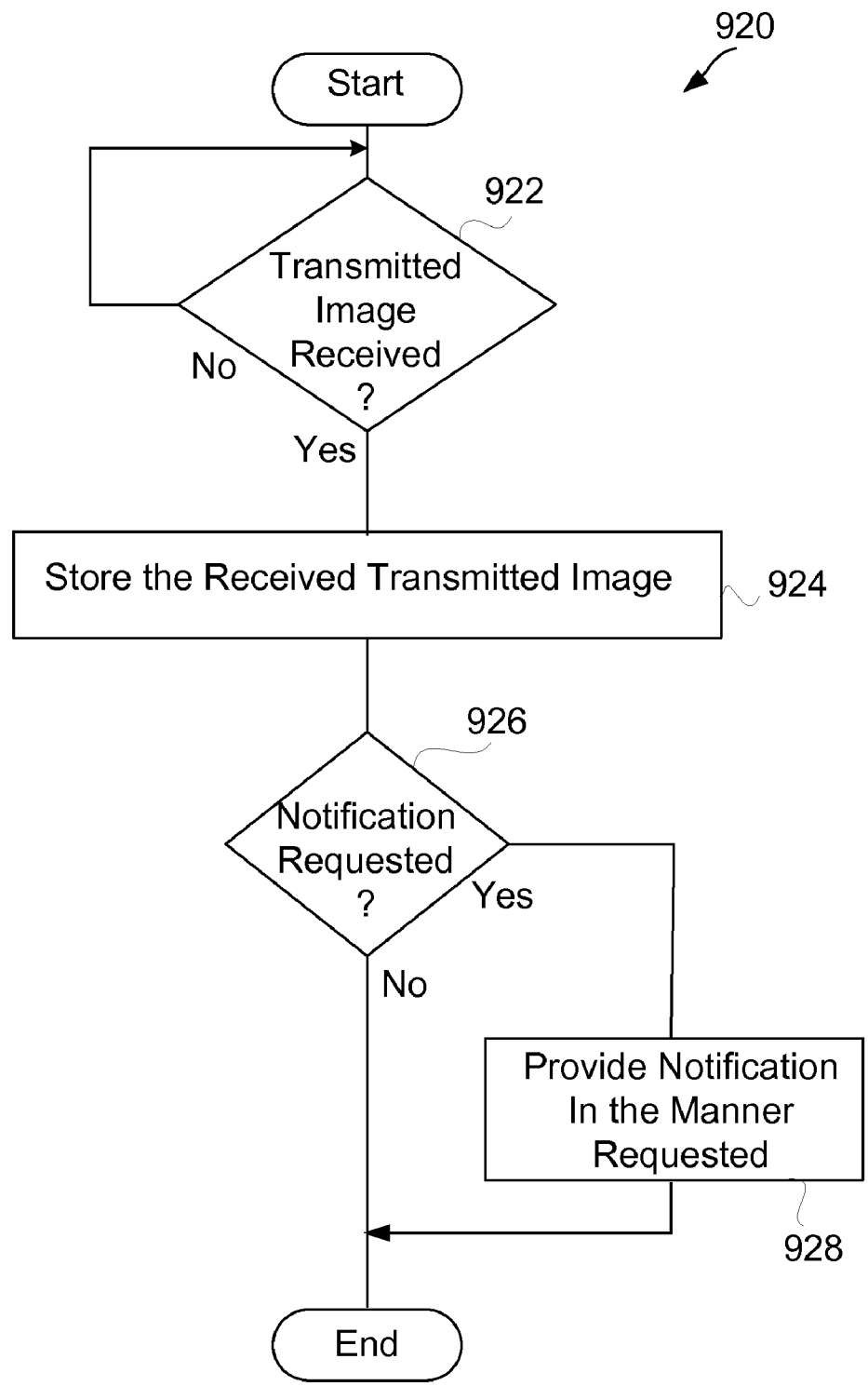
FIG. 9B is a flow diagram of remote image processing at a remote computer according to an embodiment of the invention.

FIG. 9B is a flow diagram of remote image processing 920 at a remote computer. The remote image processing 920 is preferably performed by a remote computer, such as the computer 108, the home monitor server 112 or the wireless computer 122 illustrated in FIG. 1. As a further example, the wireless computer 122 may be hand held personal computer or organizer having a wireless modem link or cellular modem link.

The remote image processing 920 begins with a decision block 922 that determines whether a transmitted image has been received at the remote computer. When the decision block 922 determines that the transmitted image has not yet been received, then the remote image processing 920 waits until the reception of such image. Once the decision block 922 determines that the transmitted image has been received, then the remote image processing 920 continues.

The received transmitted image is stored 924 to data storage provided by the remote computer. Next, decision block 926 determines whether notification has been requested. Here, the notification is requested by the user of the remote computer in most cases, though others could also request the notification. If the decision block 926 determines that notification has been requested, then notification is provided 928 in the manner requested. Following the block 928 as well as following the decision block 926 when no notification is requested, the remote image processing 920 is complete and ends.

Figure 9C:
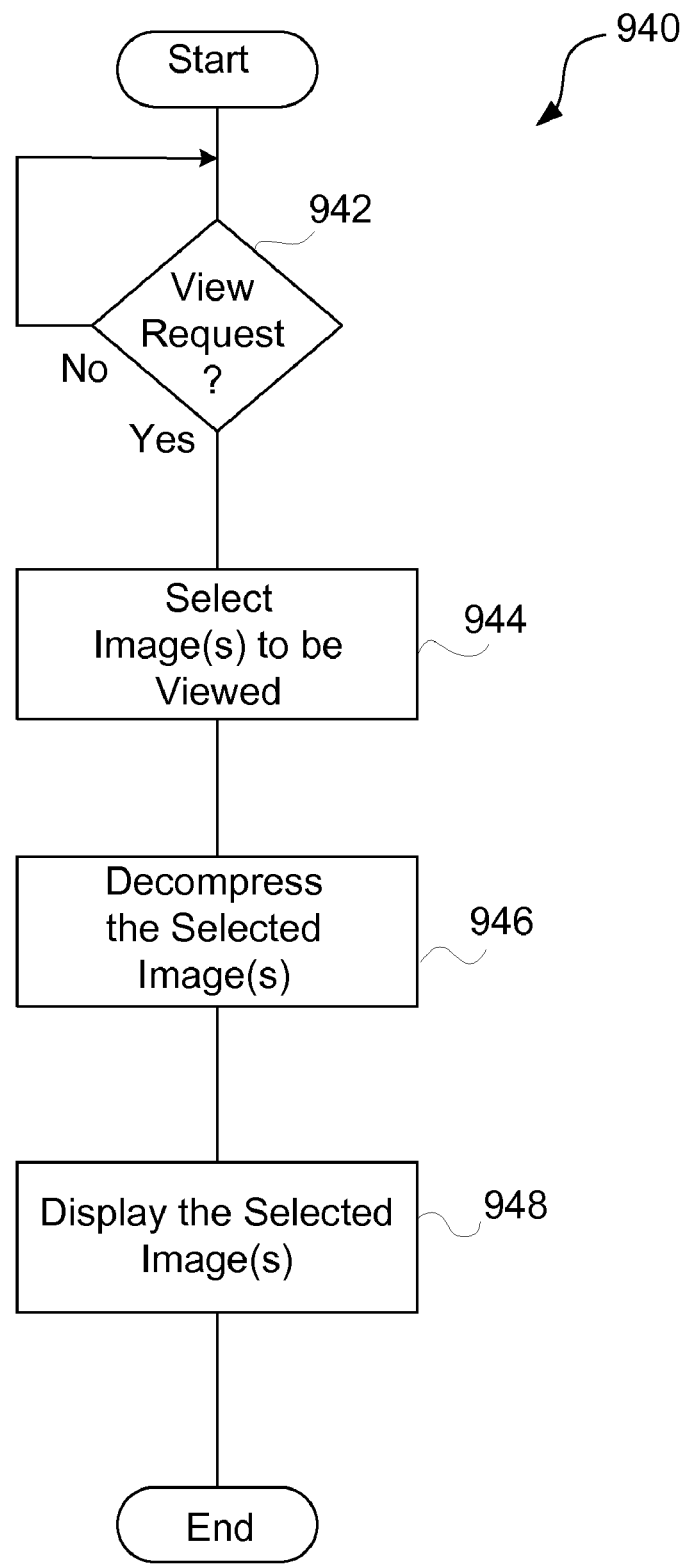
FIG. 9C is a flow diagram of view processing at a remote computer according to an embodiment of the invention.

FIG. 9C is a flow diagram of view processing 940 at a remote computer. The remote computer as was the case in FIG. 8B, can be the computer 108, the home monitor server 112 or the wireless computer 122. The remote computer performing the view processing 940 need not be the same remote computer performing the remote image processing 920.

The view processing 940 begins with a decision block 942 that determines whether a view request has been received. Typically, the view request is generated manually by a user of the remote computer or automatically such as by the remote image processing. If the decision block 942 determines that a view request has not yet been received, then the view processing 940 waits until the reception of such a request. Once the decision block 942 determines that a view request has been received, the view processing 940 continues. The view processing 940 then selects 944 image(s) to be viewed 944. Here, the user is able to preferably select one or more images to be concurrently viewed on a display device. Next, the selected image(s) are decompressed 946. In this embodiment, we assume that the images were initially stored in a compressed format. Of course, if the images are not being stored in a compressed form, there would be no need for decompression. The selected images are then displayed 948 on a display device. Following block 948, the view processing 940 is complete and ends.

In yet another embodiment of the invention, the remote monitoring of locations (e.g., a home, business, hospital room, daycare facility) can not only provide efficient bandwidth utilization as noted above but also intelligent camera positioning or selection. For example, if the schematic diagram 400 illustrated in FIG. 4 where to represent the internal layout of a location that provides daycare services, then the various areas (e.g., rooms but could also include external areas such as a playground area) could be monitored with a single camera. Alternatively, the various areas could be monitored using a plurality of cameras. The intelligent camera positioning or selection thus allows a remote viewer to rapidly identify the particular one or more of the various areas being monitored that they desire to view using the images from the associated cameras. The intelligent selection will be described with reference to an example where the location is a daycare facility and a parent desires to remotely monitor their child's activities, behavior and treatment. With this example, then the parent remotely desiring to monitor their child has difficulty determining which the one or more cameras that depict their child at any given point in time because the child tends to move about at the daycare facility and thus frequently leaves the images of some cameras and comes into images of other cameras. It is therefore a time consuming task for a parent to constantly have to search for the appropriate camera that is capturing the images of their child. The intelligent camera selection offered by one aspect of the invention eliminates this burden from the parent by automatically determining an appropriate camera for a particular remote viewer (e.g., parent).

There are several ways to provide intelligent camera selection. One way is to have the remote viewer initially identify their child, then the monitoring system tracks the identified child about the location and automatically select the most appropriate view for the remote viewer to watch. The tracking could be performed by requiring the children at the location to wear different colors, and then the monitoring system is able to track the children by color. Another way to perform the tracking is to have the children carry radio transmitters with distinctive frequencies or data identifiers, and for the monitoring system to include one or more receivers to locate the most appropriate camera based on the strength of the signals or be a triangulation technique. The transmitters can be small low power devices than transmit a short burst of information every so often (e.g., every 1-5 minutes). Still another way is for the children to include Global Positioning System devices to location their global position, and then transmitting data (by any of a variety of ways) of their global position to the monitoring system which then in turn identifies the most appropriate camera view for an identified child. The remote viewer would normally still be allowed to manually select an area or view to monitor if so desired. Besides monitoring children, the monitoring system can also be used to track other individuals or animals in similar ways.

In the above-described embodiments, images were obtained from cameras and transmitted. These images can refer to still camera images, video images, and the like. The format of the images can also take many form, namely JPEG, PICT, TIF, MPEG, etc. Still further, audio information may also be provided to the remote viewer apart or together with the images.

The notifications provided to a remote user or interested person can be achieved in a variety of ways. For example, the notification can be by telephone (wired or cellular), paging, electronic mail, or Internet notifications. The telephone notification can play a message, the pager can display a message, and the electronic mail message can contain a text, audio and/or visual message. The Internet notifications can use "push" technology to notify or forward images to a remote user or interested person. "Push" technology is, for example, described in PC Magazine, vol. 16, no. 11, pp. 156-180 (1997) which is hereby incorporated by reference.

The invention also relates to remote monitoring and controlling of devices or appliances. The information appliances are located in, for example, the home location 102, and the remote monitoring is facilitated by the Internet 104 such that a remote user at a remote computer is able to both monitor and control information appliances at the home location 102 using the Internet 104. The processing carried out at the local machine and the remote machine are described below for embodiments of the invention.

Figure 10A:
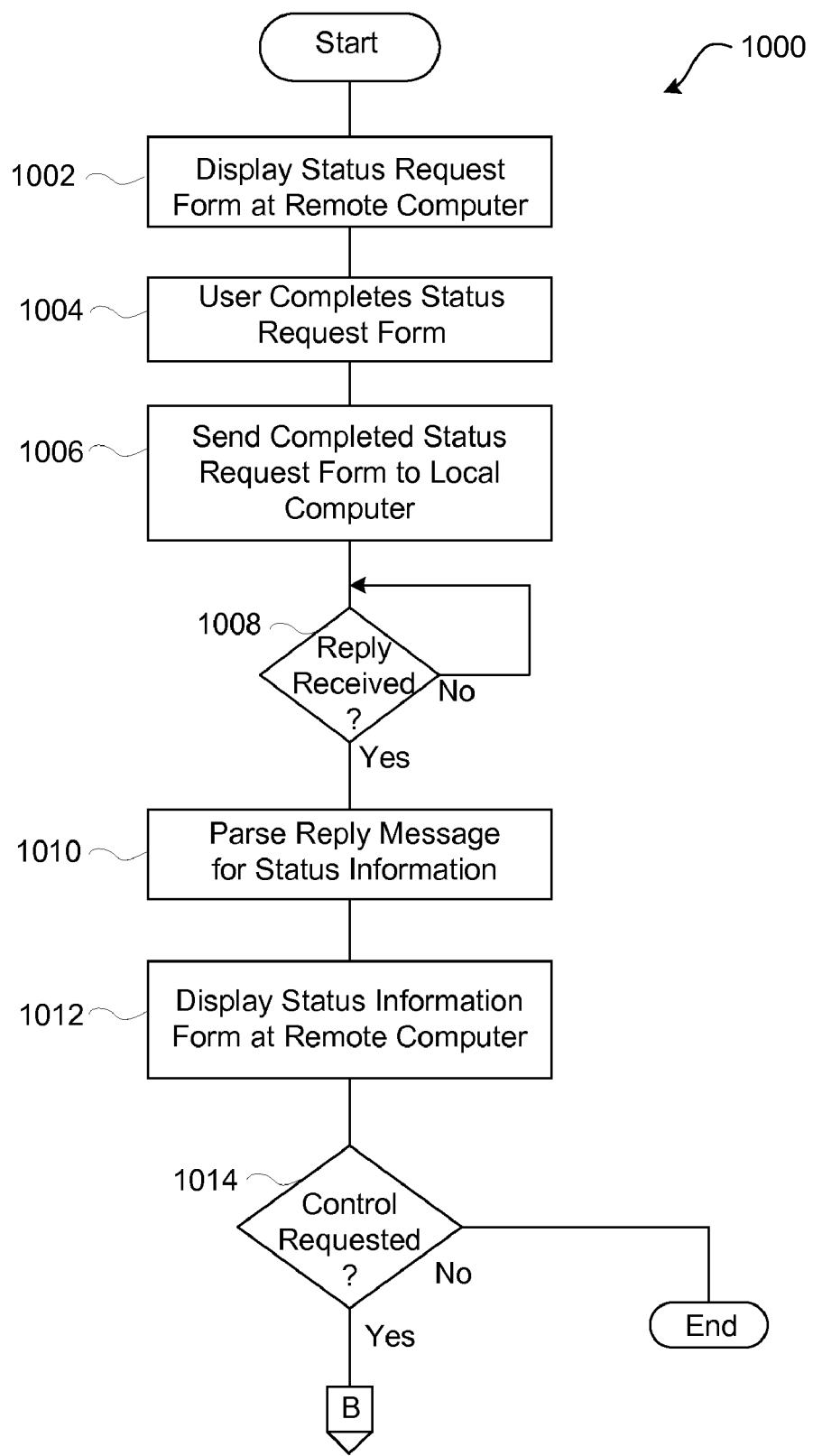
FIGS. 10A and 10B are flow diagrams of remote request processing according to an embodiment of the invention.
Figure 10B:
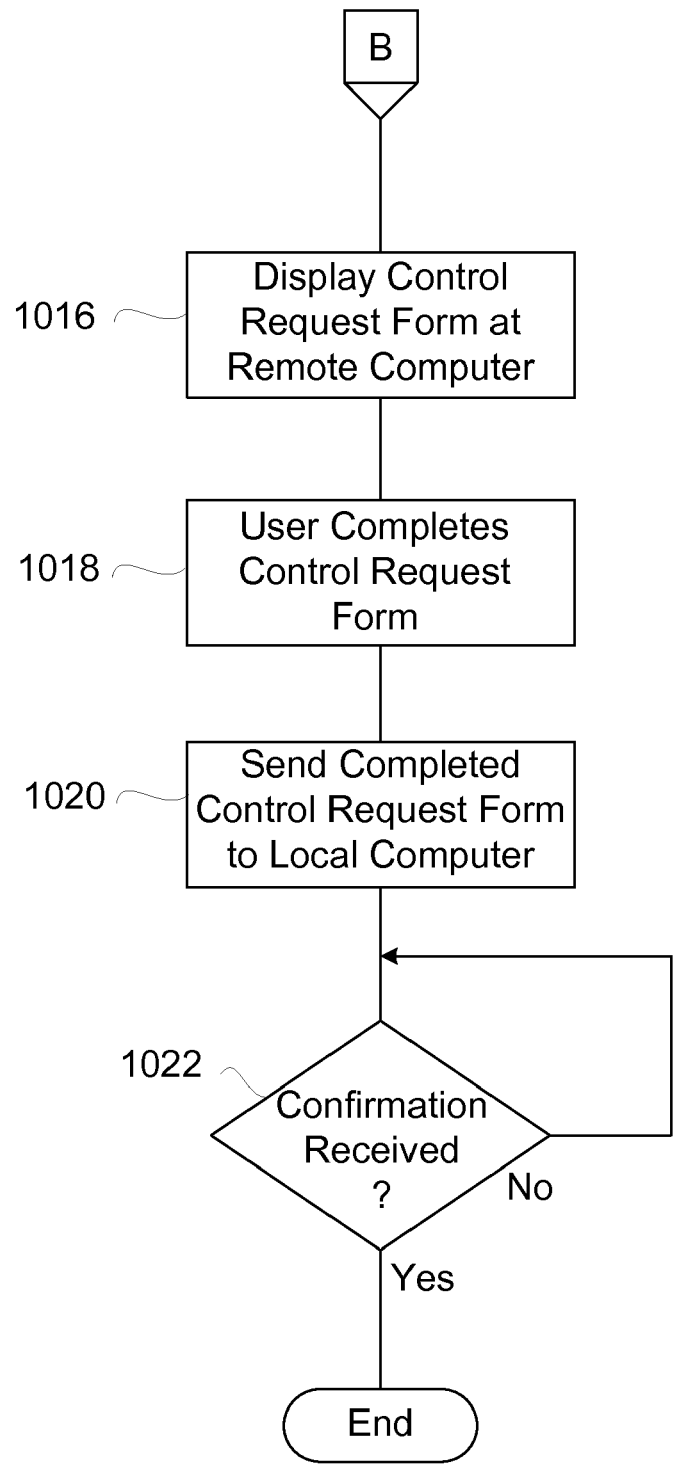

FIGS. 10A and 10B are flow diagrams of remote request processing 1000 according to an embodiment of the invention. The remote request processing 1000 begins by displaying 1002 a status request form on a display for the remote computer. Next, the user of the remote computer completes 1004 the status request form so as to indicate the particular information appliances for which status information is desired. For example, the user may request status information for an alarm system, VCR, digital TV programming or other home entertainment controls, home utilities including lighting, heating, cooling, sprinkler system, and the like. The completed status request form is then sent 1006 to a local computer.

Next, a decision block 1008 determines whether a reply message has been received from the local computer in response to the completed status request form. If the reply message has not been received, the remote request processing 1000 awaits its receipt. Once the reply message has been received, the remote request processing 1000 continues.

When the remote request processing 1000 continues, the reply message is parsed 1010 for the status information. Next, the status information form is displayed 1012 at the remote computer. In this embodiment, the status information is presented to the user at the remote computer in the status information form that is displayed at the remote computer. Preferably, the status information form is a window of a graphical user interface that displays the status information for the various information appliances in a manner that is easily understood by the user. Next, a decision block 1014 determines whether control is requested. Here, the remote request processing 1000 determines whether the user also desires to control one or more of the information appliances associated with the system. If the remote user does not wish to control any of the information appliances, the remote request processing is complete and ends.

On the other hand, when the remote user does wish to control one or more information appliances, the remote request processing continues. In this regard, the control request form is then displayed 1016 at the remote computer. Next, the user completes 1018 the control request form. Here, the user completes the control request form so as to indicate the actions the user desires for particular information appliances. For example, the user may request the control to adjust the temperature control to 60 degrees F., or turn-on certain lights, or reset the VCR or digital TV for recording certain channels. The completed control request form is then sent 1020 to the local computer. Next, a decision block 1022 determines whether a confirmation has been received from the local computer. If a confirmation has not yet been received, the remote request processing 1000 awaits its reception. If the confirmation is not received in a predetermined amount of time, the remote request processing 1000 could operate to notify the remote user that the control requested for the particular information appliance has not been confirmed. In any event, when confirmation is received, the remote request processing 1000 is complete and ends.

In other embodiments of the remote request processing 100, the confirmation may be eliminated or bypassed by a user. Also the confirmation can be of different types, for example, confirm its transmission, confirm its receipt, confirm that the information appliance understands the requests, or confirm that the information appliance has complied with the request.

Figure 11:
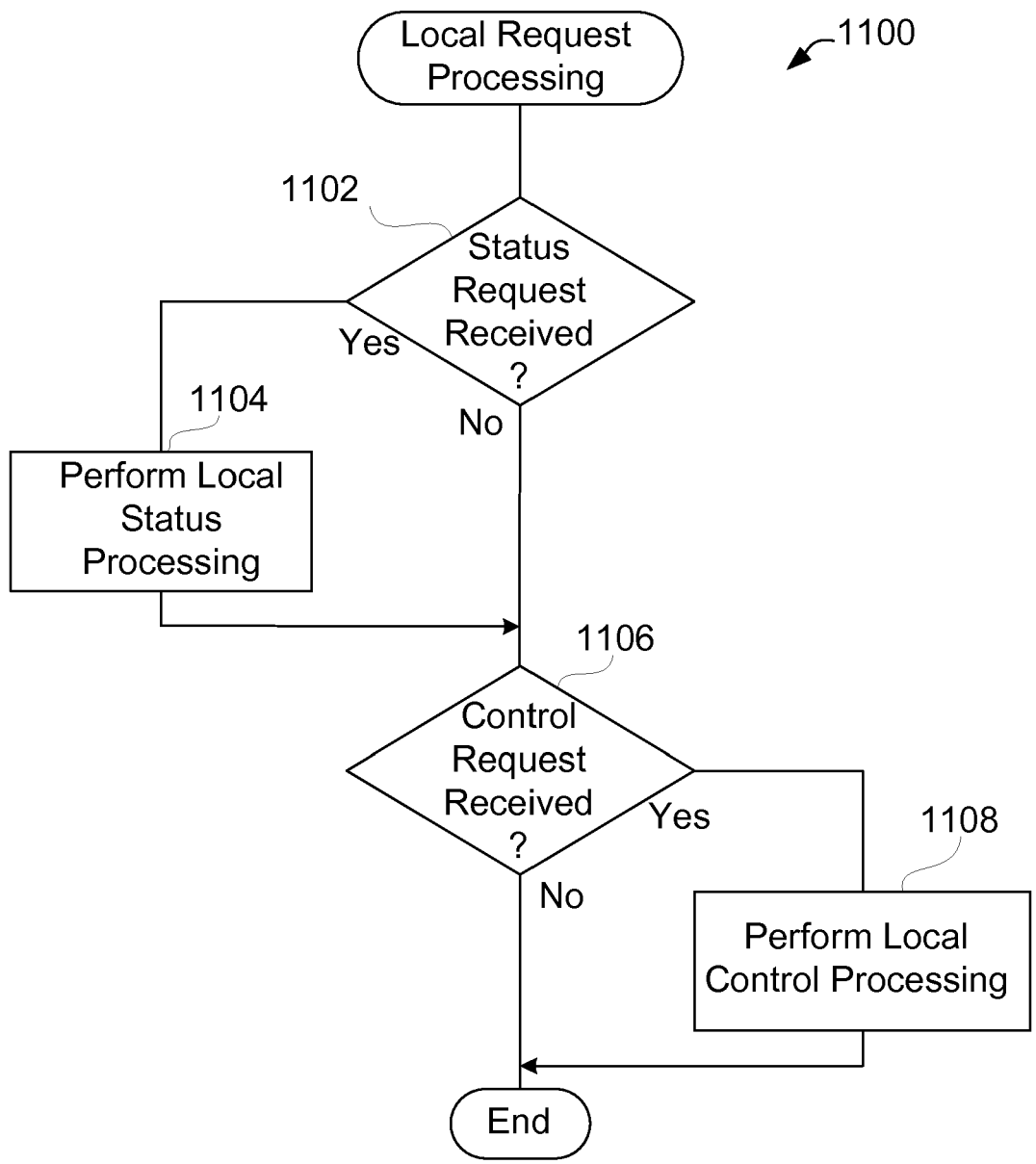
FIG. 11 is a flow diagram of local request processing according to an embodiment of the invention.

FIG. 11 is a flow diagram of local request processing 1100 according to an embodiment of the invention. The local request processing 1100 is for example performed by a computer at the home location 102. The local request processing 1100 begins with a decision block 1102 that determines whether a status request has been received. If a status request has been received at the local computer, local status processing is performed 1104. The local status processing is described in detail below with respect to FIG. 12. On the other hand, if the decision block 1102 determines that a status request has not been received, or following the performance of the local status processing 1104 when a status request has been received, a decision block 1106 determines whether a control request has been received. If a control request has been received, local control processing is performed 1108. The local control processing is described in detail below with respect to FIG. 13. On the other hand, if a control request has not been received, or following the local control processing when a control request has been received, the local request processing 1100 is complete and ends.

Figure 12:
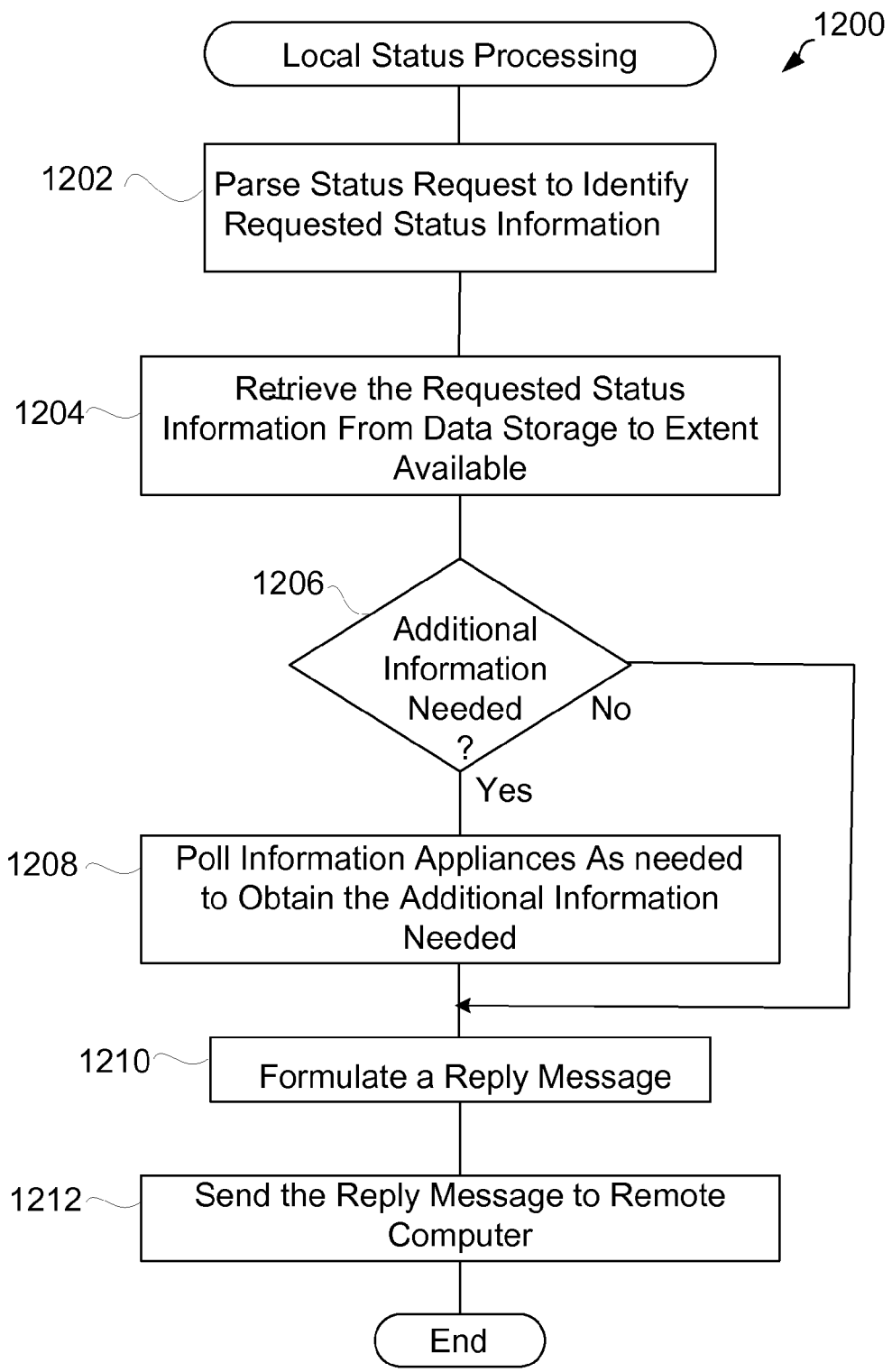
FIG. 12 is a flow diagram of local status processing according to an embodiment of the invention.

FIG. 12 is a flow diagram of local status processing 1200 according to an embodiment of the invention. The local status processing 1200 is, for example, performed by the block 1104 in FIG. 11.

The local status processing 1200 initially parses 1202 the status request to identify requested status information. The requested status information identifies the particular status information that the remote user is requesting. Then, the requested status information is retrieved 1204 from data storage to the extent available. The data storage, for example, could be the data memory storage associated with the local computer. In some embodiments, the local computer may periodically poll or otherwise track the status of certain information appliances and maintains such information in data storage (e.g., disk drive or main memory).

Next, a decision block 1206 determines whether additional information is needed. In other words, the decision block 1206 determines whether additional information is needed after the local status processing 1200 has attempted to retrieve the requested status information from the data storage. If additional information is still needed, information appliances are polled 1208 as needed to obtain the additional information needed. On the other hand, if the decision block 1206 determines that additional information is not needed, the block 1208 is bypassed. Next, a reply message is formulated 1210. The reply message is then sent 1212 to the remote computer. Following block 1212, the local status processing 1200 is complete and ends.

Figure 13:
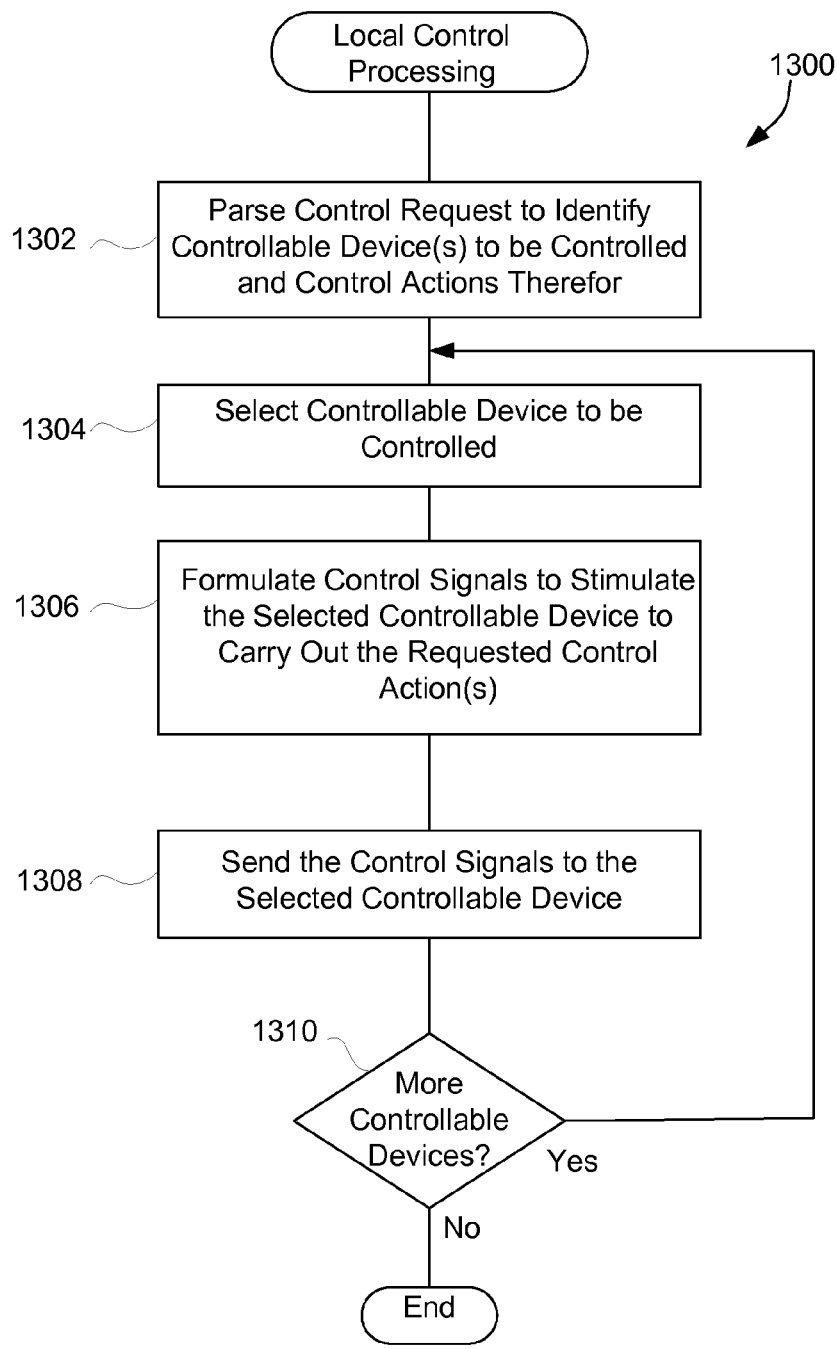
FIG. 13 is a flow diagram of local control processing according to an embodiment of the invention.

FIG. 13 is a flow diagram of local control processing 1300 according to an embodiment of the invention. The local control processing 1300 is, for example, the processing performed by the block 1108 in FIG. 11.

The local control processing 1300 initially parses 1302 the control request to identify the one or more information appliances to be controlled as well as control actions for each of the information appliances to be controlled. For example, the information appliance being controlled might be an air conditioning unit, and the control action might be to cool the home to 65 degrees F. In another example, the information is a VCR or digital TV and the control actions can be to record channel 7 from 8:00 to 10:00 p.m. on a VCR tape or a digital TV buffer. In yet another example, the information appliance is a view monitoring system and the control action could be to turn-on.

Next, one of the identified information appliances to be controlled is selected 1304. Then, control signals to stimulate the selected information appliance to carry out the requested control actions are formulated 1306. The control signals are then sent 1308 to the selected information appliance. The manner with which the control signals are sent 1308 can vary from appliance to appliance, and might include light beams (infrared light, ultraviolet light), radio waves, or electrically conductive wires. Next, a decision block 1310 determines whether there are more information appliances are to be controlled. If the control request identifies other information appliances to be controlled, then the decision block 1310 causes the local control processing 1300 to return to repeat blocks 1304 through 1310 for another of the information appliances identified by the control request. On the other hand, when the decision block 1310 determines that all the identified information appliances to be controlled have been processed, then the local control processing 1300 is complete and ends.

Figure 14:
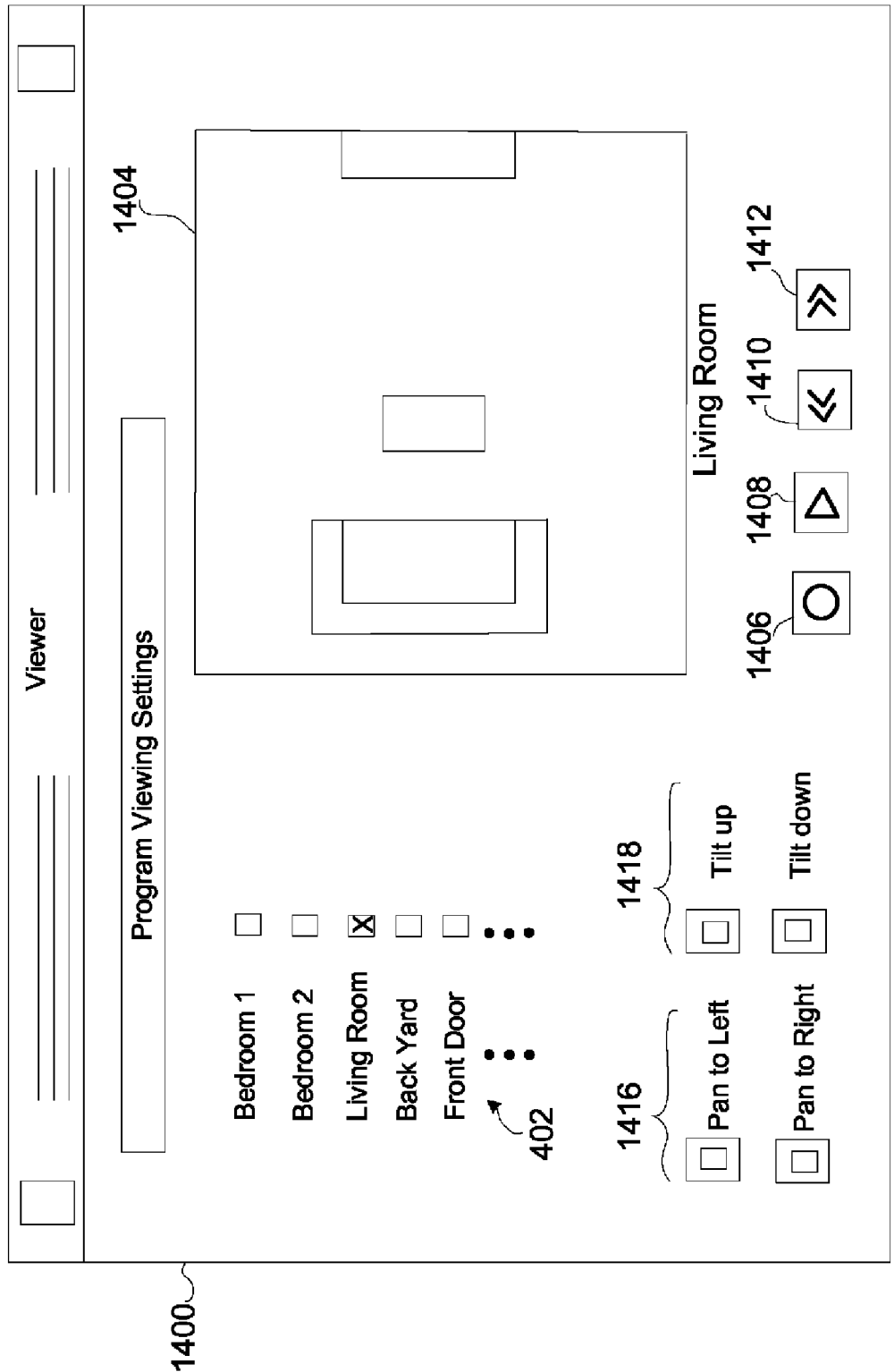
FIG. 14 is a graphical user interface (GUI) window for a remote computer according to an embodiment of the invention.

FIG. 14 is a graphical user interface (GUI) window 1400 for a remote computer according to an embodiment of the invention. In particular, the GUI window 1400 is suitable for implementing the displaying of the images at a remote location via the view processing 940. The GUI window 1400 is a representative window for a camera surveillance system for a home. The GUI window 1400 illustrates program viewing settings 1402 which operate to select the location within the home that the user of the remote computer desires to view remotely. The GUI window 1400 also includes a viewing window 1404 that displays the image(s) of the selected location. If the images available are video images (e.g., MPEG) or if a series of still images (e.g., JPEG) are present, then a stop button 1406, a play button 1408, a rewind button 1410 and a fast forward button 1412 can be used to view different images in a VCR like manner. Further yet, the GUI window 1400 may include a pair of panning control icons 1416, and a pair of tilting control icons 1418 for real-time control of the camera from a remotely networked computer. In addition, the user may modify the size of the viewing window 1404 by simply dragging out a corner of the viewing window 1404. Although only one room is shown being viewed at one time, the GUI window 1400 may be modified to display multiple rooms or locations on one screen.

FIG. 15 is another GUI window 1500 for a remote computer according to an embodiment of the invention. In particular, the GUI window 1500 is suitable for implementing the displaying of the images at a remote location via the remote request processing 1000. The GUI window 1500 is a representative window for an appliance monitoring and control system for a home. Here, the GUI window 1500 can display either the status information form (1012) or the control request form (1016) for devices or appliances in a home, including home security, home utilities, and home entertainment. Although not illustrated in FIG. 15, the GUI window 1500 can further include an area facilitating a user's selection of notification request options, thus allowing the user to easily alter the type and frequency of notification received from a remote location.

Turning first to the home security section of the GUI window 1500, the remote user is able to turn on or off the home cam (i.e., camera apparatus 402 of FIG. 4) from a remotely networked computer system. By way of example, if the home owner switches off the home cam when at home, and then later desires to switch the home cam back on remotely while on a business trip, the user may log on to the Internet 104 and access GUI window 1500 through a browser. Once the home cam is on, the home owner may desire wish to view video clips of a security breach that may have occurred in the living room. To view the security breach, the user may simply click on the "view security breach" icon which links the home owner to a GUI window 1600 of FIG. 16 below.

In the middle section of GUI window 1500, the home owner may be provided with a variety of utility controls. The utility controls may include controls for temperature of selected rooms, lighting of selected rooms, and watering of gardens for selected periods of time. In the rightmost portion of GUI window 1500 is a home entertainment control panel. This control panel may be linked to one or more VCRs or a digital TV having an internal buffer for digitally storing broadcast shows, news clips, or movies from a remote location. In one embodiment, the buffer may be partitioned into multiple segments that may be re-written continuously for a selected channel after a predetermined period of time lapses (i.e., depending on buffer sizes). By way of example, if the home owner forgets to set the VCR or digital TV to record day-time programs before going to work, the home owner may simply log onto the Internet, enter a password to access the custom GUI window 1500 for the homeowner, and then program the desired viewing channels, recording times, and dates.

Figure 16:
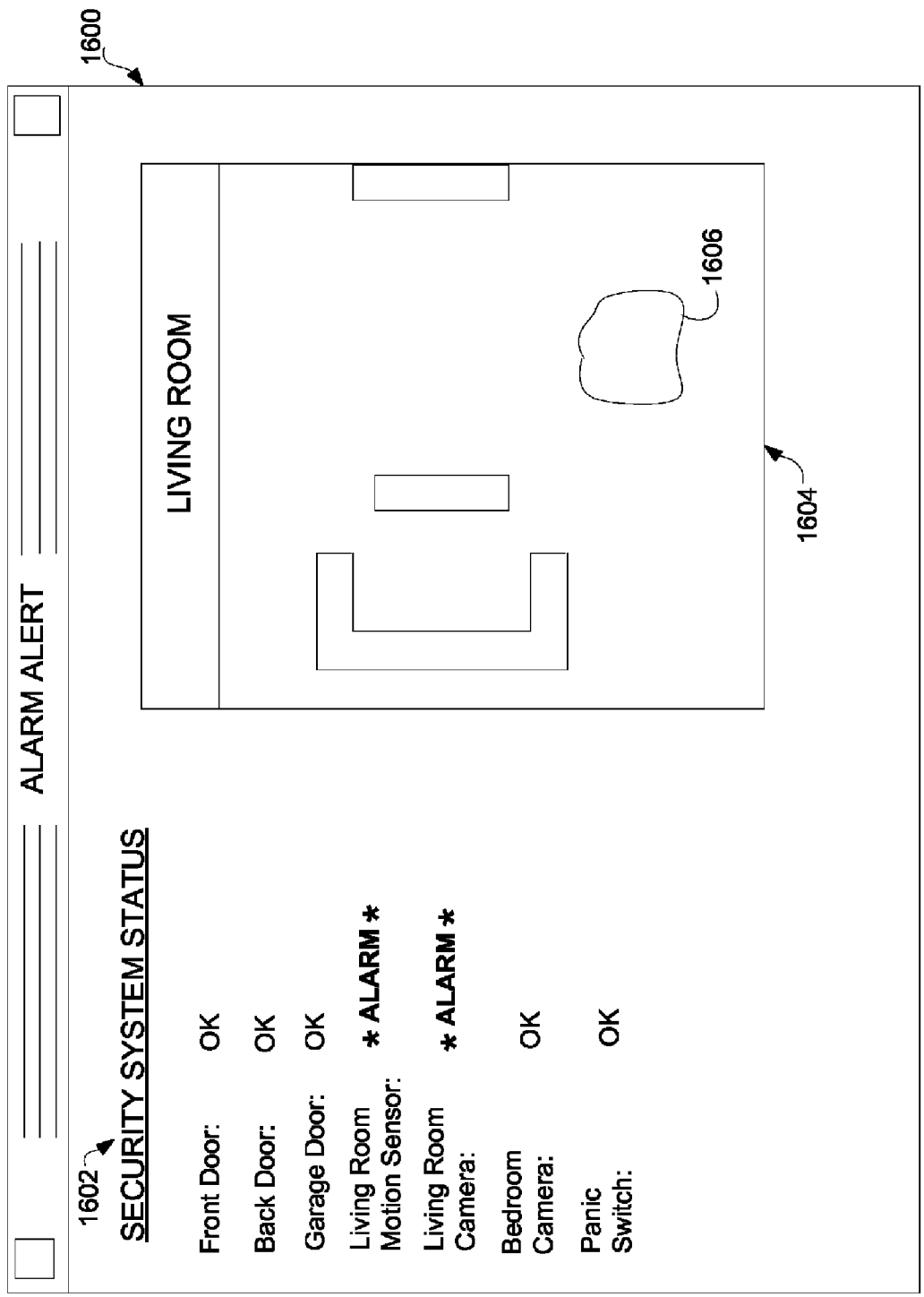
FIG. 16 is a GUI window suitable for displaying on a remote computer screen according to an embodiment of the invention.

FIG. 16 is a GUI window 1600 suitable for displaying on a remote computer screen according to an embodiment of the invention. The GUI window 1600, for example, indicates to a remotely located interested person an alarm condition of a home location. In particular, the GUI window 1600 includes a security system status area 1602 that displays the status of various devices of an alarm system, including door sensors, motion sensors, cameras, and switches. The GUI window 1600 also includes an image viewer 1604 for displaying an image or series of images. In the GUI window 1600 illustrated, the living room motion sensor and the living room camera both indicate that they have caused an alarm condition. In one embodiment, the image viewer 1604 can automatically display the most appropriate images with respect to the alarm condition, e.g., the living room, and/or could allow the user to select an image from a list of available images. The alarm condition caused the alarm system to forward this status information and/or image to a user of a remote computer in the various ways previously described.

Figure 17:
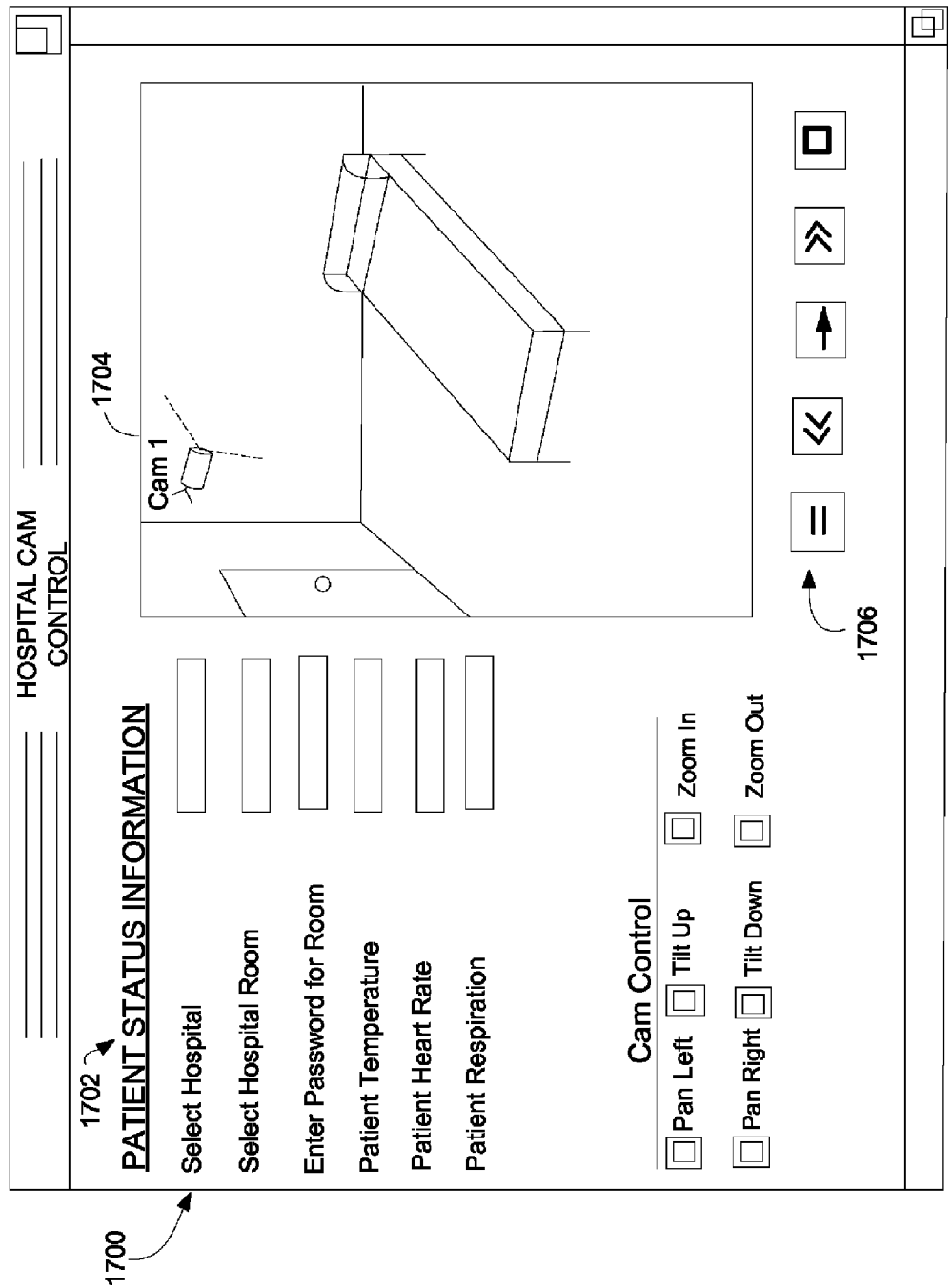
FIG. 17 is a GUI window suitable for displaying on a remote computer screen according to another embodiment of the invention.

FIG. 17 is a GUI window 1700 suitable for displaying on a remote computer screen according to another embodiment of the invention. The GUI window 1700, for example, indicates to a remotely located interested person patient information such as for a patient in a hospital or nursing home. The GUI window 1700 includes a patient status information area 1702 that displays the status of various patient monitoring equipment, patient vitals, and care provided to patient (e.g., meals, bathing, etc.). The patient status area 1702 also illustrates patient selection details for the remote user to specify the hospital (nursing home), room (or patient) and a password so as to verify that the remote user has access privileged to view the particular room (and patient). Of course, the patient selection details could be provided in an earlier screen to the remote user so as to provide more screen area for actual patent information. The GUI window 1700 also includes an image viewer 1704 for displaying an image or series of images. In the GUI window 1700 illustrated, the image is of a bed that is typically provided in a room of a hospital or nursing home. A control panel 1706 enables the remote user to start, stop, fast forward, rewind, and pause a video clip, or change still images being displayed in the image viewer 1704. Note that the image displayed in the image viewer 1704 indicates another camera (CAM 1) in the back area of the room. The control panel would allow the remote user to select the images from the CAM 1 for display in the viewer window 1704.

Further, the GUI window 1708 may further include a camera (CAM) control panel 1708 that enables the remote user to control the camera positioning in the room from remote location so as to obtain the view within the room desired. Additionally, the remote computer displaying the GUI window 1700 could also provide alerts (e.g., notifications) to the remote user. The alerts would be electronically transmitted and these alerts could then be obtained remotely by the remote user and perhaps displayed on the remote computer similar to that illustrated in FIG. 16 with respect to an alarm system. Other types of notifications such as discussed above for other embodiments are also possible.

Although the above discussion primarily concerning monitoring pertains to visual monitoring, the above-described embodiments can also provide audio monitoring together with the video monitoring. In the case, were the monitoring stores a video clip (e.g., JPEG), then the audio can be part of the video clip. Even with still images, audio from the monitored location can also be transmitted to the intermediate server computer or to a user's remote computer. The audio can be sent in a streaming fashion for a real-time audio effect, or can be sent periodically, or can be send when an alarm or update condition is detected. The amount of audio saved and/or transmitted can be reduced by saving or transmitting audio data pertaining to alarm or update conditions. For example, the system could start to save and/or transmit audio data occurring just before the alarm or update condition and then continue up until some time after the alarm or update condition.

Also, although much of the discussion above dealt with one-way monitoring, detecting or controlling, the monitoring, detecting and controlling can also be provided in a two-way manner. With a two-way configuration, visual (and perhaps audio) can be made available to user's at the local location and the remote location. For example, with respect to FIG. 17, a patient can not only see but also speak with the remote user and vice versa. As another example, a person or animal at a home location being monitored can communicate (e.g., see and/or hear) with the remote user. The communications had can also be in nearly real-time.

The invention can also be embodied as computer readable code on a computer readable medium. The computer readable medium is any data storage device that can store data which can be thereafter be read by a computer system. Examples of the computer readable medium include read-only memory, random-access memory, CD-ROMs, magnetic tape, optical data storage devices, and networks. In the case of networks, computer readable medium includes a wired or wireless link over which the computer readable code is transmitted with electrical signals. The computer readable code can also be distributed over network coupled computer systems so that the computer readable code is stored and executed in a distributed fashion.

The many features and advantages of the present invention are apparent from the written description, and thus, it is intended by the appended claims to cover all such features and advantages of the invention. Further, since numerous modifications and changes will readily occur to those skilled in the art, it is not desired to limit the invention to the exact construction and operation as illustrated and described. Hence, all suitable modifications and equivalents may be resorted to as falling within the scope of the invention.

What is claimed is:

1. A method for controlling an information appliance at a local location from a remote location, said method comprising:
   (a) identifying an information appliance capable of being controlled at the local location, the information appliance being electrically connected to a local computing device, and the local computing device capable of being electrically connected to a network of computers;
   (b) obtaining, at a remote computing device at the remote location, status information for the information appliance at the local location;
   (c) displaying a graphical user interface on the remote computing device at the remote location, the graphical user interface including at least (i) a portion of the status information pertaining to the information appliance and (ii) a plurality of selectable control actions for the information appliance, and the remote computing device capable of being electrically connected to the network of computers;
   (d) receiving a selection of at least one of the control actions for the information appliance, the at least one of the control actions to be performed at the local location;
   (e) forming a control message for the information appliance;
   (f) electrically sending the control message from the remote computing device to the local computing device;
   (g) sending control signals from the local computing device to the information appliance in accordance with the control message;
   (h) controlling the information appliance based on the control signals;
   wherein the information appliance receives television broadcasts over a plurality of channels, the information appliance being associated with a digital data storage device in the local location that is able to store a limited amount of digital data associated with the television broadcasts, and
   wherein the graphical user interface includes a selection screen for controlling selection of the channels to record the associated television broadcasts in the digital data storage device.

2. A method as recited in claim 1, wherein the network of computers includes or makes use of at least a portion of the Internet.

3. A method as recited in claim 1, wherein said sending (f) uses one of electronic mail and a web browser.

4. A method as recited in claim 1, wherein the information appliance is a home appliance.

5. A method as recited in claim 1, wherein said sending (g) of the control signals uses one or both of radio waves and cables.

6. A method for remotely controlling home appliances associated with a home over a network, comprising the operations of:
   identifying home appliances that are interconnected to a first processing unit located in the home, with the first processing unit capable of coupling to the network;
   receiving status information pertaining to at least one of the home appliances;
   presenting the status information on a graphical user interface associated with a second processing unit that is remotely located from the first processing unit and also capable of coupling to the network;
   communicating a control signal through the graphical user interface associated with the second processing unit that is remotely located from the first processing unit and also capable of coupling to the network; and
   wherein the control signal is directed to at least one of the home appliances via the network, and the control signal causes a change in an operating state of the at least one of the home appliances when received by the at least one of the home appliances;
   wherein the at least one of the home appliances is a digital data storage device associated with a television system receiving television broadcasts over a plurality of channels, the digital data storage device provided in the home and is able to store a limited amount of digital data associated with the television broadcasts, and
   wherein the graphical user interface includes one or more screens for presenting status information pertaining to the digital data storage device and for controlling selection of one or more of the associated television broadcasts to be recorded in the digital data storage device.

7. A method for controlling a digital storage device at a local location from a remote location, said method comprising:
   identifying a user account;
   identifying a digital data storage device associated with the user account;
   presenting, on a remote computing device, at least one graphical control screen for (i) presenting current status information regarding the digital data storage device, (ii) configuring remote scheduling of one or more recordings by the digital data storage device, the graphical control screen permitting a remote user at the remote location to select one or more television broadcasts to be recorded at the local location;
   receiving at least a remote scheduling request from the remote user via the graphical control screen;
   configuring the digital data storage device at the local location to record the selected one or more television broadcasts based on the remote scheduling request; and
   thereafter recording the selected one or more television broadcasts using the configured digital data storage device at the local location,
   wherein the remote computing device and the digital data storage device are capable of being electrically connected to a network of computers, and
   wherein a central server connected to the network of computers receives the remote scheduling request from the remote computing device and electronically transmits at least one control message to the digital data storage device to thereby configure the digital data storage device to record the selected one or more television broadcasts based on the remote scheduling request.

8. A method as recited in claim 7, wherein said identifying of the user account comprises receiving a user identifier and password.

9. A method as recited in claim 7, wherein the network of computers pertains to a portion of the Internet.

10. A method as recited in claim 7, wherein the remote computing device operates a web browser, and wherein the remote user initiates the remote scheduling request by interacting with the graphical control screen being displayed by the web browser.

11. A method as recited in claim 7, wherein said recording comprises recording the selected one or more television broadcasts to the digital data storage device for a predetermined period of time.

12. A method as recited in claim 7, wherein the digital data storage device is partitioned into a plurality of storage areas, and wherein particular television broadcast content can be continuously re-rewritten in at least one of the storage areas.

13. A method as recited in claim 7, wherein the at least one graphical control screen displays an indication of television broadcasts that have been previously recorded or that have been previously scheduled for recordation by the digital data storage device.

14. A method as recited in claim 7, wherein the at least one graphical control screen is customized based on the user account.

15. A method as recited in claim 7, wherein the digital data storage device is provided within a television system.

16. A method as recited in claim 6, wherein the graphical user interface includes a status screen for presenting the status information pertaining to the digital data storage device, and a selection screen for controlling selection of the associated television broadcasts to be recorded in the digital data storage device.

17. The method of claim 6, wherein the second processing unit is a portable processing unit capable of communicating over a wireless link.

18. The method of claim 7, wherein the remote computing device is a portable computing device capable of communicating over a wireless link.

19. The method of claim 1, wherein the remote computing device is a portable computing device capable of communicating over a wireless link.

20. A non-transitory computer readable medium including at least computer program code stored thereon facilitates control of a digital storage device at a local location from a remote location using a central server, said computer readable medium comprising:
   computer program code for identifying a user account;
   computer program code for identifying a digital data storage device associated with the user account
   computer program code for presenting, within at least one graphical control screen on a remote computing device, (i) current status information regarding the digital data storage device, and (ii) user interface controls for configuring remote scheduling of one or more recordings by the digital data storage device, the graphical control screen permitting a remote user at the remote location to select one or more television broadcasts to be recorded at the local location;
   computer program code for receiving at least a remote scheduling request from the remote user via the graphical control screen; and
   computer program code for causing configuration of the digital data storage device at the local location to record the selected one or more television broadcasts based on the remote scheduling request;
   wherein the selected one or more television broadcasts are thereafter recorded using the configured digital data storage device at the local location,
   wherein the remote computing device and the digital data storage device are capable of being electrically connected to a network of computers, and
   wherein the central server connects to the network of computers, receives the remote scheduling request from the remote computing device, and electronically transmits at least one control message to the digital data storage device to thereby configure the digital data storage device to record the selected one or more television broadcasts based on the remote scheduling request.

21. A non-transitory computer readable medium as recited in claim 20, wherein the user account being identified includes a user identifier and password.

22. A non-transitory computer readable medium as recited in claim 20, wherein the network of computer pertains to a portion of the Internet.

23. A non-transitory computer readable medium as recited in claim 20, wherein the remote computing device operates a web browser, and wherein the remote user initiates the remote scheduling request by interacting with the graphical control screen being displayed by the web browser.

24. A non-transitory computer readable medium as recited in claim 20, wherein the at least one control message to the digital data storage device causes recording of the selected one or more television broadcasts to the digital data storage device for a predetermined period of time.

25. A non-transitory computer readable medium as recited in claim 20, wherein the digital data storage device is partitioned into a plurality of storage areas, and wherein particular television broadcast content can be continuously re-written in at least one of the storage areas.

26. A non-transitory computer readable medium as recited in claim 20, wherein the at least one graphical control screen displays an indication of television broadcasts that have been previously recorded or that have been previously scheduled for recordation by the digital data storage device.

27. A non-transitory computer readable medium as recited in claim 20, wherein the at least one graphical control screen is customized based on the user account.

28. A non-transitory computer readable medium as recited in claim 20, wherein the digital data storage device is provided within a television system.

* * * * *

UNITED STATES PATENT AND TRADEMARK OFFICE
CERTIFICATE OF CORRECTION

PATENT NO.        : 8,073,921 B2                                     Page 1 of 1
APPLICATION NO.   : 11/115021
DATED             : December 6, 2011
INVENTOR(S)       : Thomas et al.

It is certified that error appears in the above-identified patent and that said Letters Patent is hereby corrected as shown below:

IN THE COVER PAGE:
Page 2, under OTHER PUBLICATIONS, col. 2, line 20, "push@netscape.com" should be
 --pushpull@netscape.com--.
Page 2, under OTHER PUBLICATIONS, col. 2, line 34, "Crestron pgs." should be
 --Crestron--.

Col. 6, line 37, "this" should be --thus--.
Col. 8, line 14, "assume" should be --assumed--.
Col. 12, line 6, "form" should be --forms--.
Col. 16, line 39, "were" should be --where--.
Col. 16, line 45, "send" should be --sent--.
Col. 16, line 57, "user's" should be --users--.
Col. 16, line 67, "can be" should be --can--.

Col. 20, line 28 (claim 22, line 2), "of computer" should be --of computers--.

Signed and Sealed this
Twenty-fifth Day of September, 2012

David J. Kappos
*Director of the United States Patent and Trademark Office*